US010212462B2

(12) United States Patent
Acharya et al.

(10) Patent No.: US 10,212,462 B2
(45) Date of Patent: Feb. 19, 2019

(54) INTEGRATED INTELLIGENT SERVER BASED SYSTEM FOR UNIFIED MULTIPLE SENSORY DATA MAPPED IMAGERY ANALYSIS

(71) Applicant: VIDEONETICS TECHNOLOGY PRIVATE LIMITED, West Bengal (IN)

(72) Inventors: Tinku Acharya, West Bengal (IN); Tuhin Bose, West Bengal (IN)

(73) Assignee: VIDEONETICS TECHNOLOGY PRIVATE LIMITED, West Bengal (IN)

( * ) Notice: Subject to any disclaimer, the term of this patent is extended or adjusted under 35 U.S.C. 154(b) by 73 days.

(21) Appl. No.: 15/644,925

(22) Filed: Jul. 10, 2017

(65) Prior Publication Data

US 2017/0311013 A1 Oct. 26, 2017

Related U.S. Application Data

(63) Continuation-in-part of application No. 13/347,796, filed on Jan. 11, 2012, now Pat. No. 9,704,393.

(51) Int. Cl.
*G06F 15/16* (2006.01)
*H04N 21/24* (2011.01)
(Continued)

(52) U.S. Cl.
CPC ....... *H04N 21/2404* (2013.01); *G06K 9/4604* (2013.01); *G06K 9/6202* (2013.01); *G06T 7/11* (2017.01); *G08G 1/0175* (2013.01); *H04L 67/12* (2013.01); *H04N 5/77* (2013.01); *H04N 7/18* (2013.01); *H04N 7/183* (2013.01); *H04N 21/2187* (2013.01); *H04N 21/23116* (2013.01);
(Continued)

(58) Field of Classification Search
CPC .............. H04N 7/18; H04N 21/23418; H04N 21/2187; H04N 21/23116; H04N 5/77; G08G 1/0175; G08B 13/19656
USPC ........................................................ 709/202
See application file for complete search history.

(56) References Cited

U.S. PATENT DOCUMENTS 6,757,008 B1 * 6/2004 Smith .................... H04N 5/225
348/143
8,312,160 B2 * 11/2012 Van Meerbergen ........................
A61B 5/0002
709/230

(Continued)

*Primary Examiner* — Anthony Mejia
(74) *Attorney, Agent, or Firm* — The PL Law Group, PLLC

(57) ABSTRACT

An integrated intelligent server based system includes at least one autonomous system containing one or more analytical server for unified multiple sensory data mapped multi-modal or multi-sensory imagery analysis, generating analysis result and streaming of the sensory data with the generated analysis result to the receiver module. A fail safe and fault tolerant technique to generate, store and stream the multi-sensory images to the receiver module is also proposed. Once received, the receiver module extracts the sensory data and the results of the sensory data analysis from the image and video using a suitable decoder. The integrated intelligent server based system would enable embedding the results of the sensory data analysis within the image itself and streaming the multi-sensory image embedded with the results of said sensory data analysis to a receiver module. This results in adopting this new concept in Internet of Things scheme of activities as well.

25 Claims, 14 Drawing Sheets

(51) Int. Cl.
*H04L 29/08* (2006.01)
*H04N 21/231* (2011.01)
*H04N 21/234* (2011.01)
*G06K 9/46* (2006.01)
*G06K 9/62* (2006.01)
*G06T 7/11* (2017.01)
*H04N 7/18* (2006.01)
*G08G 1/017* (2006.01)
*H04N 5/77* (2006.01)
*H04N 21/2187* (2011.01)
*G08B 13/196* (2006.01)

(52) U.S. Cl.
CPC . *H04N 21/23418* (2013.01); *G08B 13/19656* (2013.01)

(56) References Cited

U.S. PATENT DOCUMENTS

| | | | |
|---|---|---|---|
| 8,923,186 B1* | 12/2014 | daCosta | H04W 4/70 370/312 |
| 2007/0039030 A1* | 2/2007 | Romanowich | G08B 13/19608 725/105 |
| 2009/0070477 A1* | 3/2009 | Baum | H04N 21/2187 709/231 |
| 2014/0143851 A1* | 5/2014 | Baum | G08B 25/008 726/12 |

\* cited by examiner

INTEGRATED INTELLIGENT SERVER BASED SYSTEM FOR UNIFIED MULTIPLE SENSORY DATA MAPPED IMAGERY ANALYSIS

CROSS REFERENCE TO RELATED APPLICATIONS AND CLAIM OF PRIORITY

This application is a continuation-in-part (CIP) application of application Ser. No. 13/347,796, filed on Jan. 11, 2012, which claims the benefit of U.S. Provisional Application No. 61/431,448, filed Jan. 11, 2011, entire contents of which are incorporated herein by reference.

BACKGROUND

1. Field of the Invention

The present invention relates to server based sensory data analysis. More specifically, the present invention is directed to develop an integrated intelligent server based unified multiple sensory data mapped multi-modal or multi-sensory imagery analysis system. Importantly, the present integrated intelligent server based system is adapted to facilitate fail-safe integration and/or optimized utilization and analysis of various sensory inputs for various utility applications. The present server based system is also directed to a method for cost-effective and bandwidth efficient adaptive transferring/recording of multiple sensory data from single or various sensory inputs to network accessible storage/receiving devices along with performing computationally efficient unified multiple sensory data mapped imagery analysis for various utility applications at the network accessible storage/receiving device end. The architecture and underlying implementation of the present server based system is independent of any operating system and can work in multi-OS computing environment seamlessly under various resource constraints. The present invention also introducing the concept of "sixel" as a fusion of multiple sensory data in a two-dimensional grid structure and treat this multi-modal or multi-sensory data as a composite structure of several two-dimensional data array representing the multi-modal multi-dimensional sensory imagery.

2. Background of the Invention

Video Management Systems are used for video data acquisition and search processes involving single or multiple servers. They are often coupled with one or more separate systems for performing operations on the acquired video data such as analyzing the video content. The servers can record different types of data in storage media, and the storage media can be directly attached to the servers or accessed over a network e.g. internet connectivity. This demands a significant amount of network bandwidth to receive data from the sensors and to concurrently transfer or upload the data in the storage media. Due to high demand in bandwidth to perform such tasks, especially for video data, often separate high-speed network are dedicated to transfer data to storage media. Dedicated high speed network is costly and often require costly storage devices as well. Often this is overkill for low or moderately priced installations.

It is also known that to back up against server failures, one or more dedicated fail-over (sometimes called mirror) servers are often deployed in prior art. Dedicated fail-over servers remain unused during normal operations and hence resulting in wastage of such costly resources. Also, a central server process either installed in the failover server or in a central server is required to initiate the back-up service, in case a server stops operating. This strategy does not avoid a single point of failure. Moreover, when the servers and clients reside over different ends in an internet and the connectivity suffers from low or widely varying bandwidth, transmission of multi-channel data from one point to another becomes a challenge. Data aggregation techniques are often applied in such cases which are computationally intensive or suffer from inter-channel interference, particularly for video, audio or other types of multimedia data.

There are many servers based sensory data analysis systems, mostly Video content analysis systems, in the prior arts. In such server based system, sensory data analysis more specifically the video content analysis is often done per frame basis which is mostly pre-defined which make such systems lacking in desired efficiency of analytics but are also unnecessarily cost extensive with unwanted loss of valuable computing resources.

Added to the above, in case of presently available techniques of video analysis, cases of unacceptable number of false alarms are reported when the content analysis systems are deployed in a noisy environment for generating alerts in real time. This is because the traditional methods are not automatically adaptive to demography specific environmental conditions, varying illumination levels, varying behavioral and movement patterns of the moving objects in a scene, changes of appearance of spectral information under continuously changing environmental conditions, changes of appearance of multi-spectral senses in global or regional environmental conditions that has direct or indirect effects on the values of those parameters and e.g. illumination level for visual imagery, environmental parameters such as temperature, pressure, pollution level but not limited to and similar other factors.

It has therefore been a challenge to identify the appearance of a non-moving foreign object (static object) in a scene in presence of other moving objects, where the moving objects occasionally occlude the static object. The term 'Object' in the perspective of Multi-sensory image analysis is defined in the later sections. In short, it is basically detection sudden changes in the sensory value appearing in the sensory images under different demographic conditions.

Extraction of particular types of objects in images based on fiduciary points is a known technique. However, computational requirement is often too high for traditional classifier used for this purpose in the prior art, e.g., Haar classifier. Also, in a distributed system where multiple sites with independent administrative controls are present, unification of those systems through a central monitoring station may be required at any later point of time. This necessitates hardware and OS independence in addition to the backward compatibility of the underlying computational infrastructure components, and the software architecture should accommodate such amalgamation as well.

It would be thus clearly apparent from the above state of the art that there is need for advancement in the art of sensory input such as video acquisition cum recording and analytics of such sensory inputs/data such as video feed adapted to facilitate fail-safe integration and optimized utilization of various sensory inputs for various utility applications including event/alert generation, recording and related aspects.

SUMMARY

Thus, according to the basic aspect of the present invention there is provided an integrated intelligent server based system for unified multiple sensory data mapped imagery analysis of sensory data received from channels and streaming of the sensory data along with analysis result to a receiver module comprising at least one autonomous system containing one or more analytical server;

a seamless and intelligent interconnection of said autonomous systems receiving said sensory data from said channels for unified multiple sensory data mapped imagery analysis including a cooperative communication channel between all of said autonomous systems enabling desired scalability of number of the autonomous systems spread across wide geographical regions and also allocating the sensory data from the channels to the analytical servers contained in said autonomous systems through said cooperative communication channel, wherein each of said analytical server is enabled for storing the sensory data received from the channels connected to that analytical server, analyzing the stored sensory data to generate the analysis result and streaming of the sensory data with the generated analysis result to the receiver module either as individual stream for each of the connected channel, or as a joined single stream of sensory data for all or user requested channels among the connected channels; and an intelligent interface communication channel operatively linked to said cooperative communication channel, for carrying the frames with the analysis result of each said analytical server to the receiver module.

According to another aspect, the present integrated intelligent server based system for unified multiple sensory data mapped imagery analysis of sensory data received from channels and centralized storing and streaming of the sensory data along with the analysis result to a receiver module comprises at least one autonomous system containing one or more said analytical server and one or recording server;

a seamless and intelligent interconnection of said autonomous system receiving said sensory data from said channels for unified multiple sensory data mapped imagery analysis and centralized storing including a cooperative communication channel between all of said autonomous systems enabling desired scalability of number of the autonomous systems spread across wide geographical regions and also allocating the sensory data from the channels to said analytical servers and said recording servers of said autonomous systems through said cooperative communication channel whereby said cooperative communication channel enabling assessing respective server capacity, configuration of each of the recording servers to operate them as a group of the recording servers and to enable fail-safe support when any of the recording servers in the group fail to operate, remaining operative recording servers in the group distribute and take over the sensory data load of said recording servers in the group which fail to operate to thus render the system fail safe and self-sufficient;

wherein, each of said recording server in the group comprises local storage for storing the multi-sensory data in segmented clips of various size and monitor sensory data inflow rate for each of the channels into the recording server and available network bandwidth to a network accessible central storage; and said intelligent interface communication channel operatively linked to said cooperative communication channel, for carrying the frames with the analysis result of each said analytical server to the receiver module and carrying said sensory data of each said recording server to the network accessible central storage involving intelligent network bandwidth sharing amongst said channels for transferring said sensory data received from the channels to the network accessible central storage based on real time available network bandwidth as well as each of said sensory data inflow rate, local storage space of the respective recording servers wherein each of said recording server is self enabled for adjusting of rate of uploading of said segmented clips received by it to said network accessible central storage from an individual channel based on the available network bandwidth for uploading to the central storage and the sensory data inflow rate for said individual channel to its connected recording server and free local storage space of said recording server connected to said individual channel for transferring the sensory data received from said individual channel to the network accessible central storage via the local storage of said recording server in a fail-safe bandwidth optimized manner utilizing optimal bandwidth and share the available network bandwidth amongst the channels and their respective recording servers for uploading the sensory data to the network accessible central storage in fail safe manner.

According to another aspect in the present integrated intelligent server based system, each of the channels corresponds to a sensor deployed over any region or a cluster of identical sensors deployed over multiple regions of any zone for sensing a parameter of that zone and generating sensory data.

According to yet another aspect in the present integrated intelligent server based system, the analytical server comprises local storage for storing the multi-sensory data and forming sensory image for each of the channels connected to the analytical server;

image analyzer for receiving said sensory images corresponding to the connected channels in temporal sequence forming frames representing temporal variation of the sensory data and therefrom analyzing temporal and spatial association of objects to generate the analysis result; and controller for adjusting number of the sensor image frames per second feeding into said image analyzer depending on available computational space of the image analyzer at any point of time, including streaming of the sensory data with the generated analysis result to the receiver module either as individual stream for each of the channel, or as a joined single stream of sensory data for all or user requested channels of the connected channels.

According to another aspect in the present integrated intelligent server based system, the local storage of the analytical server stores the multi-sensory data with timestamp and form sixel based sensory image for each of the channels connected to the analytical server.

According to another aspect in the present integrated intelligent server based system, the local storage of the analytical server includes memory locations having two dimensional address space to store the multi-sensory data of each of the channels in two dimensional grid structure to form sixel based sensory image for each of the channels whereby the sixel corresponds to value of the sensory data in each grid point of the grid structure and each grid point corresponds to the region where the sensor has been deployed.

According to another aspect in the present integrated intelligent server based system, the frames corresponds to cluster of multiple sixel based sensory images corresponding to different channels having identical timestamp.

According to another aspect in the present integrated intelligent server based system, the controller stores the sensory data in the local storage of the analytical server overwriting the existing stored sensory data which are fed into the processor and streamed into the receiver module.

According to another aspect in the present integrated intelligent server based system, the image analyzer comprises data input port to receive the frames via the controller;
processing memory to temporarily store the frames till interpretation of the composite values of the one or more sixels of the frames and infer dynamics of the sixel objects or objects in the stored frames; and
computing module operatively connected with said processor memory to access the stored frames and analyze them by involving
estimating a background reference corresponding to the frames stored in the processor memory comprising
computing an adaptive local window centring around each sixel of the frames;
accumulating all sixel values in the local window in different sensory clusters depending on their distinguishability criteria of appearance enabling each sensory cluster consist of mean representative sixel values corresponding to each of the frames under analysis with span of sensory value deviation and a number of appearance of a sixel in that cluster;
splitting all the sensory cluster having large sensory value deviation and merging all the sense cluster which having close mean representative sixel value and constructing the background reference corresponding to the frames under analysis from sensory values of the generated merged cluster;
extracting foreground objects in the frames under analysis by involving
constructing a reference frame for each input frame stored in the processor memory from the estimated background reference corresponding to previous one or more of stored frames of that input frame;
comparing the input frame with its reference frame and constructing a difference image to extract the foreground objects;
segmenting the difference image according to the extracted foreground objects;
analysing each segment individually for classification of the objects by involving
comparing each captured foreground object with typical object shape, silhouette, color feature in the computing module for categorizing the objects;
analyzing the objects including associating with the previous frames to infer dynamics of the object using pre-determined application dependent rules to identify occurrences of any rule violation or nature of anomaly in the region;
said computing module is operatively connected with the controller to forward the generated analysis result and streaming to the receiver module.

According to another aspect in the present integrated intelligent server based system, the computing module computes the adaptive size local window by constructing an initial window of size (h, w) centring around the sixel;
computing normalized average intensity (k) of all the sixels in said initial window of size (h, w) by following $$k = \frac{Avg(h, w)}{255},$$

assuming each component in the sixel value is represented by 8 bits;
forming the adaptive local window of size (k*h, k*w) local window centered around the sixel whereby for all 0<k<1, the adaptive local window size reduces with reduction of the intensity in the region surrounding the sixel and number of distinguishable sixels which reduces the reduction of intensity of sensory values in a region enables minimization of propagation of the error in possible prediction and estimation of appearance of distinguishable sixels.

According to another aspect in the present integrated intelligent server based system, each of the sensory clusters corresponds to group of all neighbouring sixels that are different from other neighbouring sixels whereby the differences lie in the values of the sixels at any particular instant of time relative to their previous weighted-average values and the neighbouring sixels that have this relative values above a certain threshold value form a cluster, the threshold values are set based on type of particular sensory data as well as on the area of application.

According to another aspect in the present integrated intelligent server based system, the computing module discard the sixels of current frame of the frames belongs to the object sixel locations in previous frame of the frames from the estimation of the background reference corresponding to the frames.

According to another aspect in the present integrated intelligent server based system, the computing module includes computer system comprising of a first computer embodying executable first set of computer program instructions for estimating the background reference, a second computer embodying executable second set of computer program instructions for the extracting foreground objects and a third computer embodying executable third set of computer program instructions for analysing the segments.

According to another aspect in the present integrated intelligent server based system, the controller monitors availability of the processor memory for storing the frames and computational complexity of the computing module for analyzing different frames to dynamically adjust the number of the frames per second feeding into the processor.

According to another aspect in the present integrated intelligent server based system, the controller computes the computational complexity of the computing module based on (a) inter class difference of the foreground objects and background reference (b) number of foreground objects extracted and (c) extent of analysis of the segments.

According to another aspect in the present integrated intelligent server based system, the controller includes encoder for encoding the streaming of the multi-sensory data to one or more receiver modules with variable rate depending upon available bandwidth from the analytical server to the receiver and transmitting a frame header with each frame containing metadata about position, identity of the channel frame within the combined frames, resolution of the individual frames, a timestamp of the constituent streams and the analysis result corresponding to the multi-sensory images of the frames to enable the receiver module to split the combined stream of frames based on said frame header.

According to another aspect in the present integrated intelligent server based system, the receiver module includes decoder which is a natural extension of standard visual image decoders, configured to extract one or more number of image planes as the multi sensory images received from the analytical server corresponding to different sensory values including usual spectral values of optical sensors/cameras According to another aspect in the present integrated intelligent server based system, the recording servers and the analytical servers in the autonomous system auto register themselves by requesting and thereby getting a unique identification number.

According to another aspect in the present integrated intelligent server based system, the network accessible central storage comprises a cluster of one or more network accessible storage devices.

According to another aspect in the present integrated intelligent server based system, the receiver module comprises standalone surveillance client, internet browser, web client, any hand-held devices including mobile device client, and remote event and/or notification receiver having operative communication with the controller over ip based network;
said receiver module is further configured for establishing operative communication with the network accessible central storage over ip based network for accessing the stored sensory data.

According to another aspect in the present integrated intelligent server based system, the segmented clips of the sensory data includes small granular clips or segments of programmable and variable length sizes and said clips stored in the local storages of the recording servers, the clip metadata being stored in a local database.

According to another aspect in the present integrated intelligent server based system, the recording server determine the rate of uploading of the segmented clips of the sensory data received from the channels to the network accessible central storage by
calculating average of the rate of uploading for each channel separately in periodic interval involving
calculating the rate of clip upload ($U_i$) for a particular channel by (a) estimating the sensory data inflow rate ($D_i$) of said particular channel to the recording server; (b) identifying the available network bandwidth (B) at that instant from the system; (c) calculating the rate of clip upload for the particular channel, based on:

$$U_i = [B \times k \div \Sigma D_i] \times D_i,$$

where 0<k<1, depending on how much of the remaining bandwidth is to be allocated for uploading task and the amount of local storage is available in the recording server.

According to another aspect in the present integrated intelligent server based system, the intelligent interface communication channel (i) auto registers itself to the system, (ii) accepts request from surveillance clients or the receiver module and relays the same to corresponding recording server and analytical server, (iii) receives configuration data from the surveillance clients or the receiver module and feeds to the intended components of the system, (iv) receives the analysis result from the analytical server and transmits to various recipients including remote event receiver, fetches outstanding event frames, if any, (v) periodically receives heartbeat signals along with status information from all active servers and relays that to other devices in same or other networks, (vi) streams live frames, recorded frames or event alerts at appropriate time, (vii) joins multiple channel sensory inputs into a single combined stream to adapt to variable and low bandwidth network, (viii) enables search based on various criteria including data, time, event types, channels, signal features, and other system input and (ix) enables user to perform an user-interactive smart search to filter out desired segment of the sensory input.

According to another aspect, the present integrated intelligent server based system comprises central sensory data management server operatively connected with all the autonomous systems for registering all the recording servers and the analytical servers into the autonomous systems generating unique Identification number;
said central sensory data management server comprises a central database to store all configuration data related to the server including identification of sensory data sources or channels it caters to, the central storage it uses, the corresponding receiver module against the generated unique Identification number.

According to another aspect, the present integrated intelligent server based system comprises remote event receiver including object tracking system comprising:
object tracking means in conjunction and one or more PTZ cameras wherein when an object is first detected in a fixed camera view of the object tracking means the same is adapted to track the object and also generate and transmit the positional values along with a velocity prediction data to the PTZ camera controller;
said PTZ camera controller adapted to receive the positional information of the object in the PTZ camera view involving scene registration and coordinate transformation technique.

According to another aspect in the present integrated intelligent server based system, the PTZ camera controller carry out coordinate transformation following:
a. identifying a set of points in the static camera as A, B . . . and also corresponding points A', B' . . . in the PTZ camera by the user;
b. mapping any arbitrary point C in the static camera to the corresponding point C' in the PTZ camera view dynamically wherein:
$a_x$, $b_x$, $c_x$ are x-coordinates of points A, B and C respectively in the static Camera view and similarly $a'_x$, $b'_x$ and $c'_x$ are for the corresponding points in PTZ view where point C is interpolated with the help of points A and B, with a confidence factor $W_{AB}$, where $W_{AB} = (A_x - B_x) \div [\text{Minimum of } (C_x - B_x, C_x - A_x)]$ is determined to be $$C'_{xAB} = B_x' + [(A_x' - B_x') \times (C_x - B_x) \div (A_x - B_x)]$$

and wherein similarly, an estimate of x-coordinate of the same point C is generated for all pair of points (A, B) in the Static camera view based on:

$$C'_x = \Sigma [C'_{xAB} \times W_{AB}] \div \Sigma W_{AB}$$

and similarly generating also the y-coordinate $C'_y$ for the point C.

DETAILED DESCRIPTION

As stated hereinbefore the present invention discloses an integrated intelligent server based system for unified multiple sensory data mapped imagery analysis to extract meaningful and actionable information from the sensory data. The integrated intelligent server based unified multiple sensory data mapped imagery analysis system of the present invention comprises an automatic adaptive unified framework for accurate predictive multi-sensory background estimation of multiple unified sensory data acquired from different sensory inputs/sources by involving neighboring sensory values and inter-frame sensing correlation, and generate actionable information therefrom whereby the actionable information and the multiple sensory data are also transferred to network accessible central storage system or receiver system in a bandwidth adaptive manner for follow up action by man or machine.

Figure 1A:
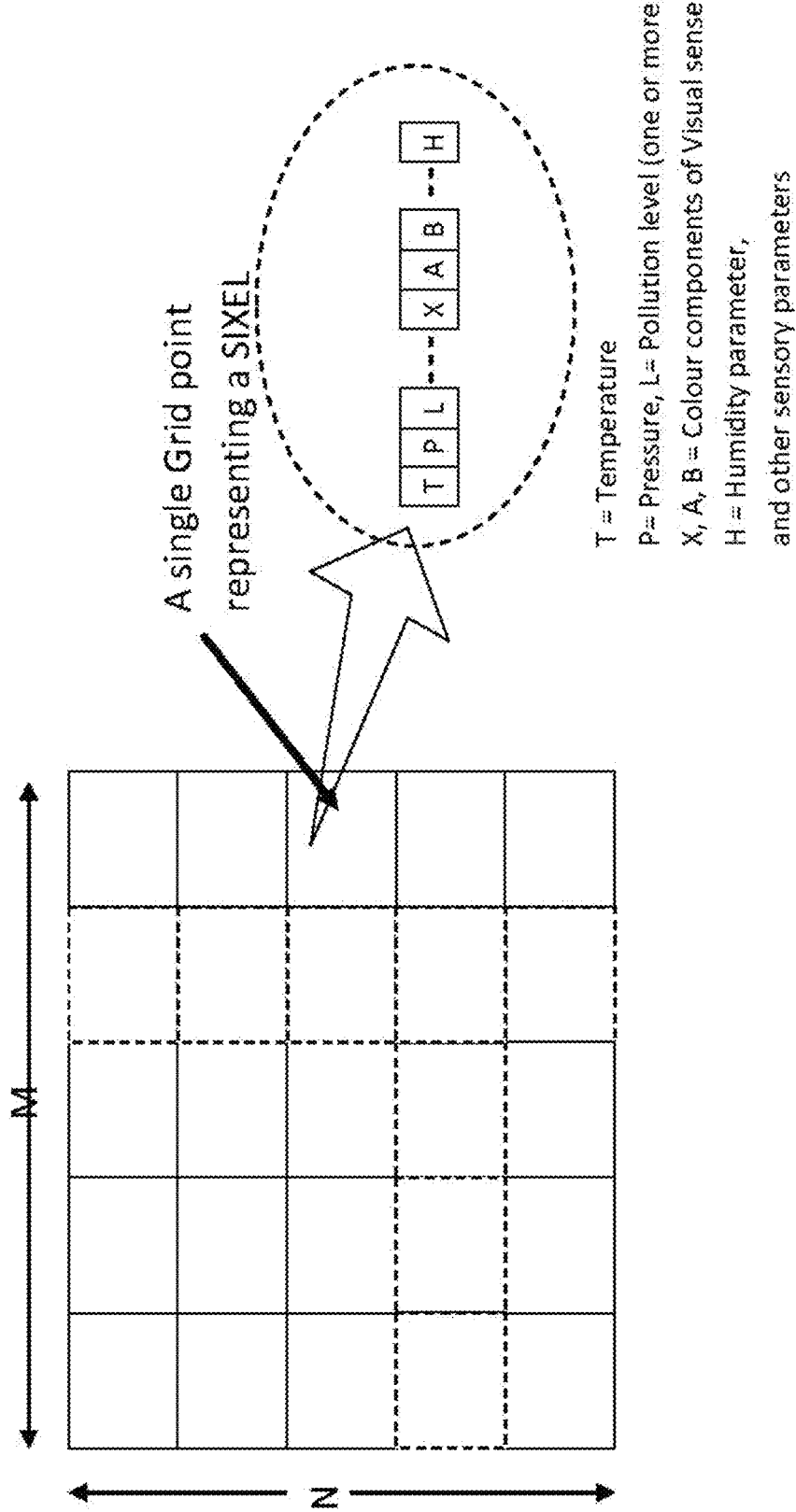
FIG. 1a shows a two-dimensional grid structured representation of sensory data image in interleaved fashion in accordance with the present invention.
Figure 1B:
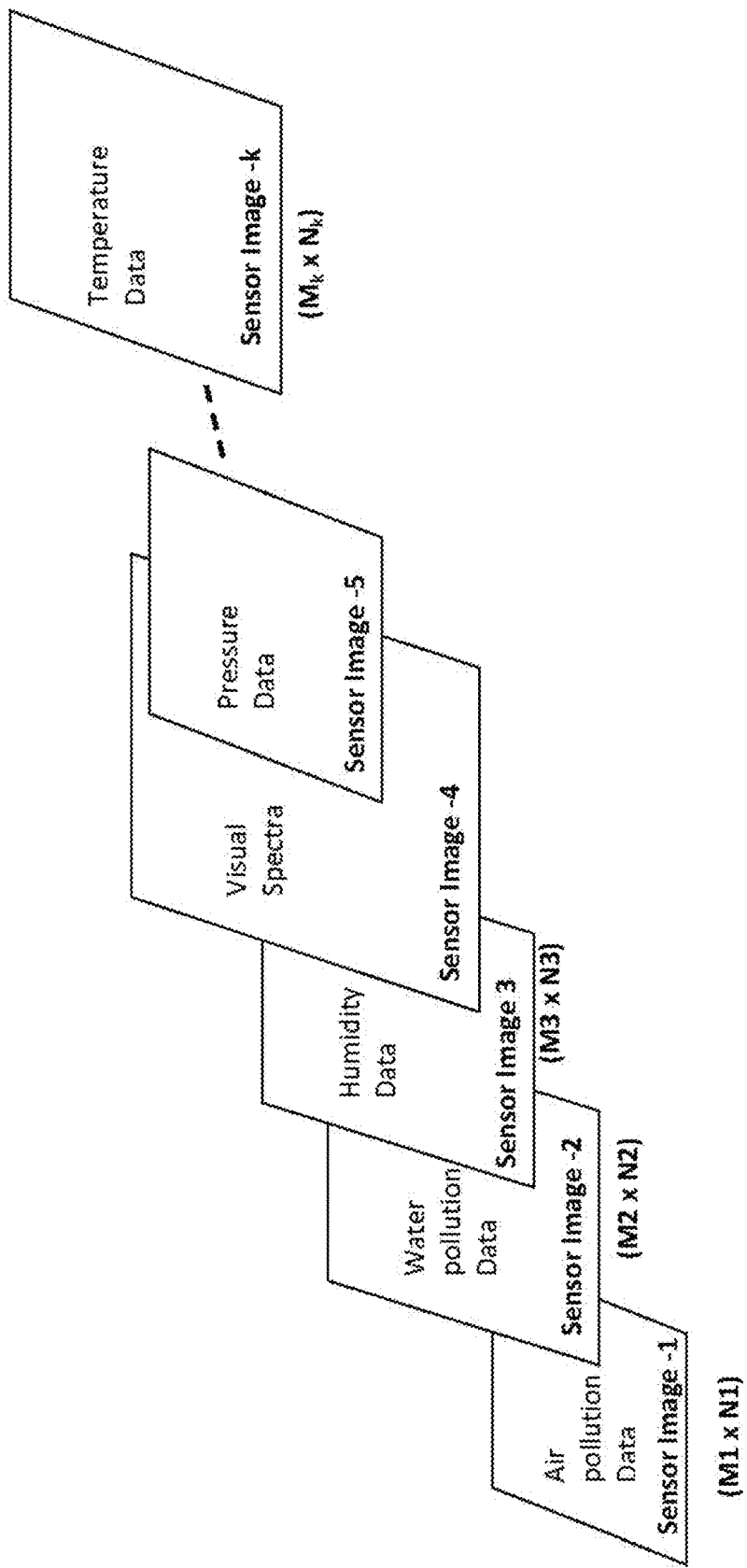
FIG. 1b shows two-dimensional grid structured representation of multi-component sensory data image in non-interleaved fashion in accordance with the present invention.

In this regard, reference is first invited from the accompanying FIG. 1a and FIG. 1b and the following terms have been defined:

(i) Sensor Imagery: A matrix representation (2 dimensional) of sensory data in a grid structure as shown in the accompanying FIG. 1a.

(ii) Sixel: It as a value of the sensor data in each grid point of the grid structure constituting the sensor imagery. A sixel can be value of average temperature of a region where each grid point represents a region, or pressure of a region where each grid point represents a region, and so on for any other sensor such as pollution sensor, flood sensor, and others. For visual spectra, the sixel can be traditional values of Red, Green, Blue spectra at a grid point.

(iii) Multi-Sensor imagery: It is the multiple components of the sensor imagery where each component represents values of relevant sensor in the corresponding grid as shown in the accompanying FIG. 1b. Here multi-sensor imagery will represent multiple components of the environment representing sensory values such as temperature, pressure, pollution level, flood sensor, etc. and it may or may not include visual information in the form of traditional R-G-B images generated by optical sensors.

(iv) Multi-Sensory Video: It is the temporal sequence of multi-sensor images (called frames) to represent temporally moving or varying condition in environment or scene which is under sensory observation. Number of such images or frames generated per second is called frames per second (fps) or the Video, in this context, multi-sensory video. In this embodiment, image sequence, video, multi-sensory video, video stream has the same meaning. The sensory frames can be represented in non-interleaved fashion as well. In non-interleaved fashion, each plane is two-dimensional composite representation of values of one sensory type. As a result, there are multiple planes each representing two-dimension signal values of each sensor data. In this fashion, the dimension of each plane can vary and hence not necessary same dimension.

(v) Object: In this embodiment, the meaning of "Object" is a spatially connected group of sixels forming a mass to represent anomaly or deviation of the concerned sensory values in the region from normal scenario, such as moving object in visual imagery, drastic temperature change in a region, drastic fall of pressure in a region, drastic rise of pollution, etc.

(vi) Sense: Interpretation of the composite values of one or more sixels (combination of different sensory data) from various sensors in a single grid point is considered as the "sense" of the happening in the environment or scene. For example, combination of one or more of temperature, pressure, humidity and possible other sensory data may indicate certain phenomena like probability of depression in the environment, which termed here as "sense".

Figure 2A:
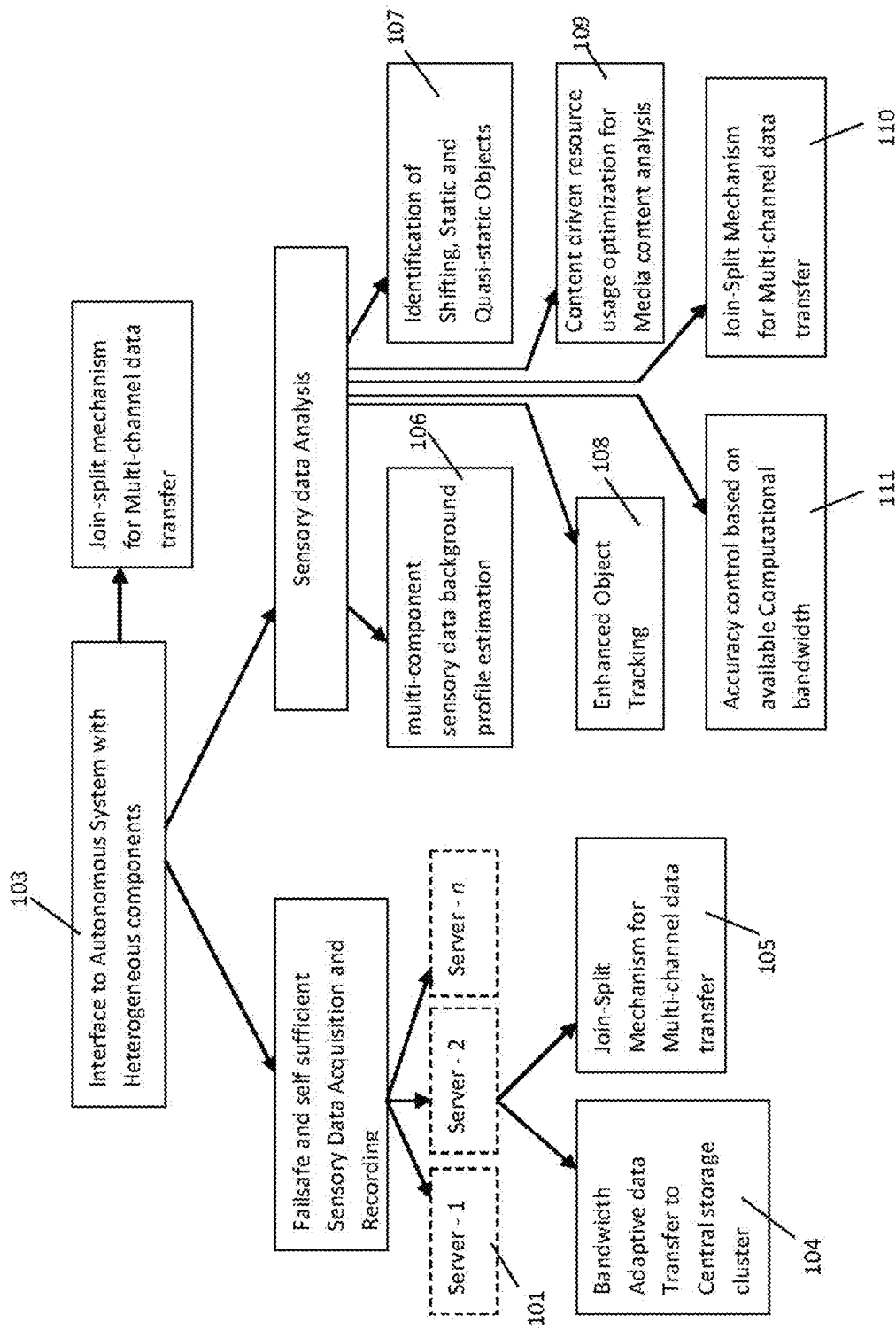
FIG. 2a shows a schematic layout of an illustrative embodiment of the present integrated intelligent server based system with sensory data recording server group and analytical server group adapted to facilitate fail-safe integration and optimized utilization of various sensory data for unified multiple sensory data mapped imagery analysis and centralized storing.

Reference is now invited from the accompanying FIG. 2a which shows the broad overview of an illustrative embodiment of the present integrated intelligent server based system. As would be apparent from the drawings, the present system basically involves the self-reliant recording server group (101), analytical server group (102) and an intelligent interface (103). Importantly, the analytical servers (102) are adapted to cater at least one of more of background estimation (106), identifying moving, static, quasi static objects (107), enhanced object tracking (108), content aware resource scheduling (109), join-split mechanism for sensory date streaming (110) and resource dependent accuracy control (111).

The recording servers of the recording server group (101), apart from being mutually cooperative and self-reliant, continuously monitor and distribute their operative load based on the number of active servers in the group are also adapted for bandwidth optimized fail-safe recording (104) and join-split mechanism for multi channel video streaming (105).

Figure 2B:
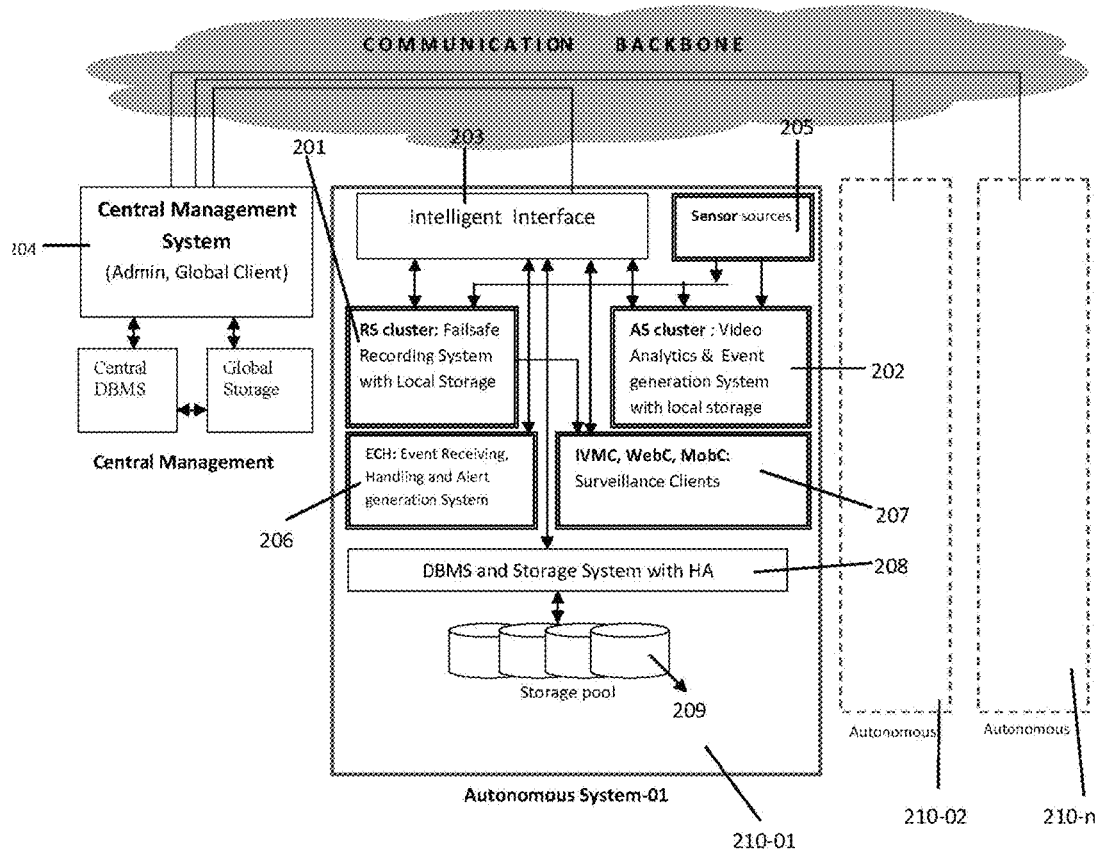
FIG. 2b shows an illustrative top level view of the present integrated intelligent server based system with framework for multiple autonomous system integration.

The various components of the above system adapted to carry out the above advanced functionalities in accordance with the present invention is further outlined and schematically described in the accompanying FIG. 2b.

1. Intelligent central sensory data management server (204)
    1.1 Recording Server group/cluster (201)
    1.2 Intelligent Interface communication channel (203)
        1.2.1 User management and Client access controller
        1.2.2 Event concentrator and Handler (206)
        1.2.3 Event distributor
2. Analytics Server group/cluster (202)
3. Receiver module (207) including Surveillance Client, Web client, Mobile device Client
4. Remote Event Receiver (206)
5. Centralized storage (209)

As it is clearly apparent from FIG. 2b, the present integrated intelligent server based system includes seamless and intelligent interconnection of multiple autonomous systems (210-01; 210-02 . . . 210-n) spread across wide geographical regions. The autonomous systems (210-01; 210-02 . . . 210-0n) are the basic building blocks for distributed operation of the present integrated intelligent server based system spanning across the wide geographical regions under different local administrative control, with a centralized view of the whole system from the single central sensory data management server (204). Each of the autonomous systems (e.g. 210-01)) is self sufficient and can be considered as a complete embodiment of the present integrated intelligent server based system configured for unified multiple sensory data mapped imagery analysis of sensory data and centralized storing and streaming of the sensory data along with the analysis result to the receiver module of that autonomous system or any other autonomous systems.

As shown in the FIG. 2b, each of the autonomous system may include either analytical server group (202) having one or more analytical server for performing unified multiple sensory data mapped imagery analysis of sensory data and streaming of the sensory data along with the analysis result to the receiver module (207) or combination of analytical server group (202) and recording server group (201) having one or more recording servers which additionally perform centralized storing of the sensory data.

The seamless and intelligent interconnection of the multiple autonomous systems (210-01; 210-02 . . . 210-0n) include cooperative communication channel between all of said autonomous systems for enabling desired scalability of number of the autonomous systems spread across wide geographical regions.

In an embodiment of the present integrated intelligent server based system wherein the autonomous systems includes analytical server group (202), the cooperative communication channel allocates the sensory data received from various sensory channels to all the analytical servers of the autonomous systems for unified multiple sensory data mapped imagery analysis of sensory data received from channels and the intelligent interface communication channel (203) which is operatively linked to the cooperative communication channel carries the sensory data with the analysis result of each of the analytical servers to the receiver module (207).

In an alternate embodiment of the present integrated intelligent server based system wherein the autonomous system includes the recording server group (201) along with the analytical server group (202), the cooperative communication channel allocates the sensory data received from various sensory channels to all the analytical and recording servers of the autonomous systems for centralized storing and unified multiple sensory data mapped imagery analysis of sensory data received from channels and the intelligent interface communication channel (203) which is operatively linked to the cooperative communication channel carries the sensory data with the analysis result of each of the analytical servers to the receiver module and also carries the sensory data of each said recording server to a network accessible central storage. In this embodiment, the cooperative communication channel between the recording server enables assessing respective server capacity, configuration of each of the recording servers to operate them as a group of the recording servers and to enable fail-safe support when any of the recording servers in the group fail to operate, remaining operative recording servers in the group distribute and take over the sensory data load of said recording servers in the group which fail to operate to thus render the system fail safe and self-sufficient.

It is important to note that in the present integrated intelligent server based system, each of the sensory channels corresponds to a sensor deployed over any region or a cluster of identical sensors deployed over multiple regions of any zone for sensing a parameter of that zone and generating sensory data. The sensor can be anything selected from pressure sensor, humidity sensor, temperature sensor, optical sensor, air flow sensor, camera sensor and like.

Figure 3:
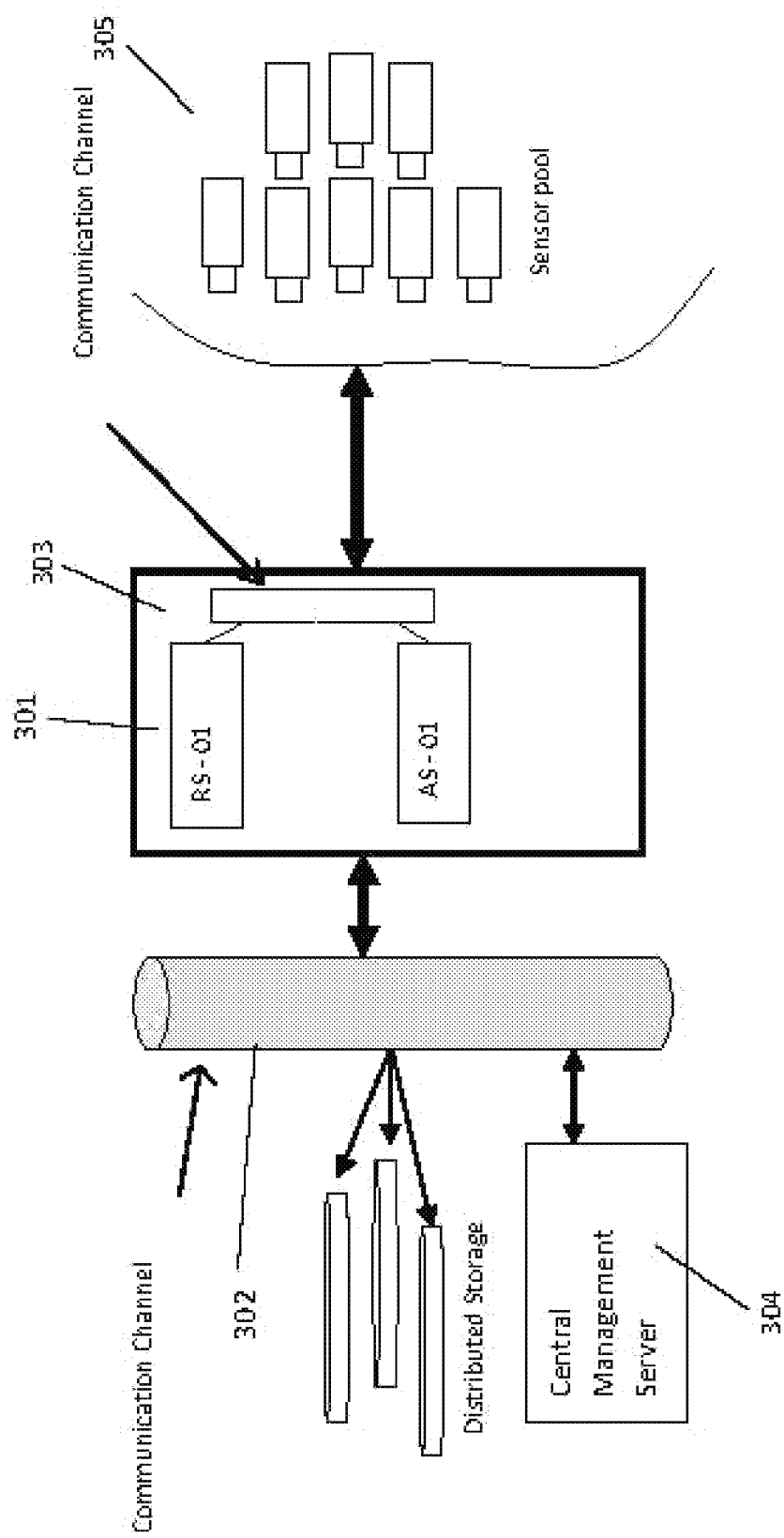
FIG. 3 shows allocation of communication channels in the present integrated intelligent server based system.

Reference is now invited to accompanying FIG. 3 which shows allocation of communication channels in the present integrated intelligent server based system by way of an autonomous system embodiment (303) having an analytical server group (AS) and a fail-safe bandwidth optimized recording server group (RS) without any failover support server. As apparent from the referred FIG. 3, for the sensory input from the pool of sensors (305) are not fed into any single server but to the group of servers (301) through the communication channel. Importantly, the communication channel is provided to carry inter-autonomous system communication among the server groups forming a team towards failover support without any central management and failover server while the communications channel (302) is provided to carry data to central storage involving intelligent bandwidth sharing technique of the invention.

All the servers in the present integrated intelligent server based system including the recording servers and analytical servers, auto register themselves into the autonomous system by requesting and then getting a unique Identification number (ID) from the central sensory data management server (204). All the configuration data related to the server including the identification of sensory data sources or channels it caters to, the central storage it uses, the corresponding receiver module are stored in a central database against this ID. This scheme has the advantage that with only one Static IP address (that of the central sensory data management system), one can access any component of the autonomous system, and the IP addresses of the individual server components may be kept varying. The sensory data sources or channels generating streaming sensory data can be auto detected or manually assigned to the recording servers and the analytical servers. The details of the channels are stored in the central database. Once done, one or more channels can be added to the recording servers and the analytical servers.

Figure 4:
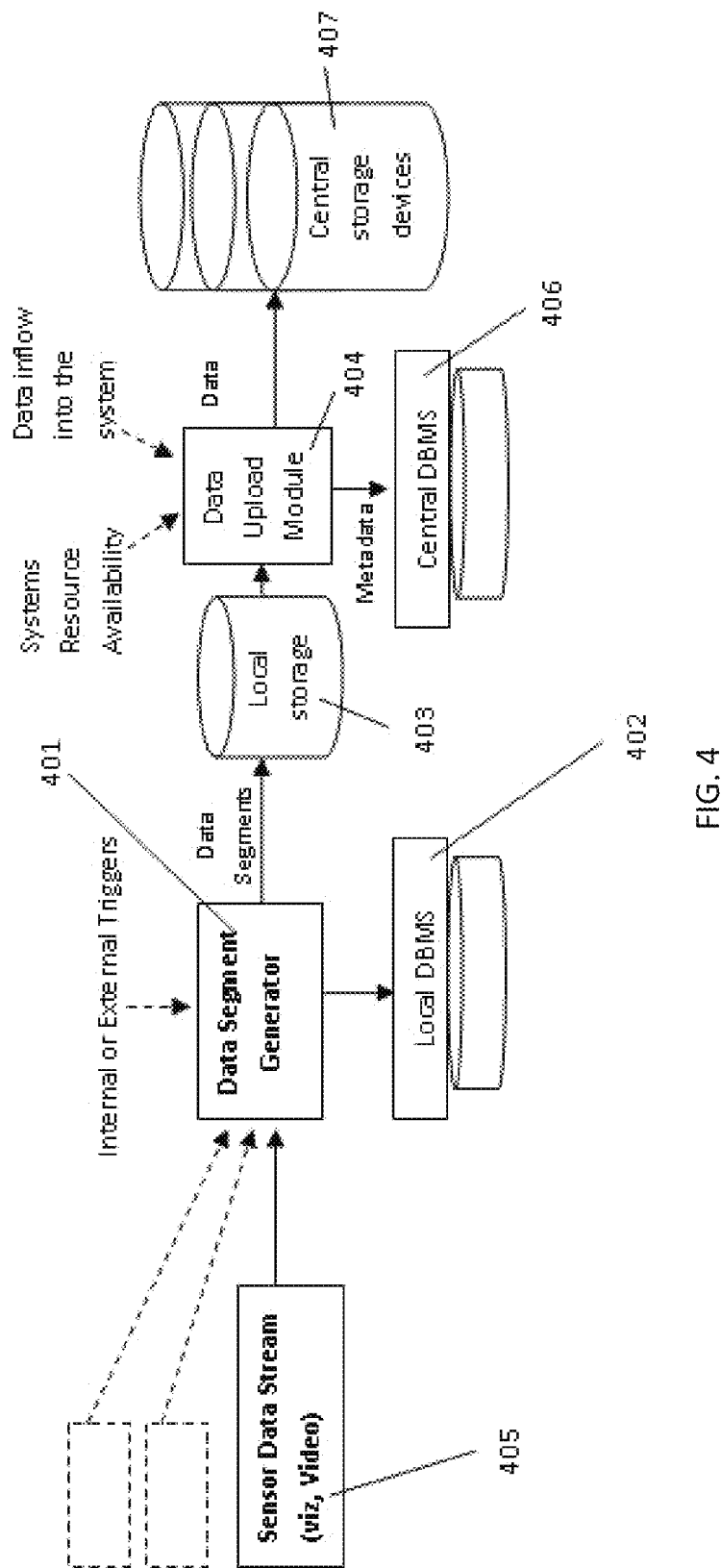
FIG. 4 shows sensory dataflow mechanism through the recording server of the present integrated intelligent server based system.

Reference is next invited from the accompanying FIG. 4 which shows dataflow mechanism in the recording servers of the present integrated intelligent server based system. As apparent from FIG. 4, the sensory data stream (405) from multiple channels feed to a data segment generator (401). In the data segment generator (401), the data stream is first segmented into small granular clips or segments of programmable and variable length sizes (usually of 2 to 10 minutes duration). The clips are stored in the local storage (403) of the recording server and the clip metadata being stored in local database (402). Next the segmented clip is uploaded through data upload module (404) to the network accessible central storage (407) and the uploaded clip metadata being stored in the central database (407).

The sensory dataflow mechanism for transferring sensory data received from the channels to the central storage via the local storage of the recording server as illustrated in the accompanying FIG. 4 includes intelligent and adaptive sharing of available network bandwidth to the network accessible central storage for uploading the segmented clips. In the present integrated intelligent server based system, instead of allocating particular channels to a particular server for recording of data, it is allocated to a 'Server group' with multiple servers in the group. The members of the group exchange their capacity information amongst themselves and share the load according to their capacity. In case of breakdown of one or more servers, the team members share the load of the failed server(s), without any central control or without support from any dedicated failover server.

For bandwidth adaptive sensory data clip uploading, each recording server not only monitors the available bandwidth but also the data inflow rate for each channel into the recording server, and accordingly adjusts the upload rate for an individual channel. More specifically, the intelligent interface communication channel which is operatively linked to the cooperative communication channel, carries the sensory data received from the channels to the network accessible central storage based on real time available network bandwidth as well as each of the sensory data inflow rate, local storage space of the respective recording servers wherein each of said recording server adjust rate of uploading of the segmented clips received by it to the network accessible central storage from an individual channel based on the available network bandwidth for uploading to the central storage and the sensory data inflow rate for said individual channel to its connected recording server and free local storage space of said recording server connected to said individual channel for transferring the sensory data received from said individual channel to the network accessible central storage via the local storage of said recording server in a fail-safe bandwidth optimized manner utilizing optimal bandwidth and share the available network bandwidth amongst the channels and their respective recording servers for uploading the sensory data to the network accessible central storage in fail safe manner.

Thus the advancement is directed to use optimal bit rate for uploading sensory data. The average bit rate for each channel is calculated separately in periodic intervals. For that, the sensory data streaming rate ($D_i$) of a particular channel ($C_i$) to the local storage of the recording server is estimated. Also the available network bandwidth (B) for uploading to the network accessible central storage at that instant is known from the System. The frequency of Clip upload for channel, $C_i$ is then calculated as:

$$U_i = [B \times k \div \Sigma D_i] \times D_i,$$

where 0<k<1, depending on how much of the remaining bandwidth is to be allocated for uploading task and availability of the local storage space of the recording server.

In the present integrated server based system, automatic separation of foreground moving objects from the static background in a sixel based sensory image sequence is the primary task executed by the analytical servers for subsequent analysis of the sensory data. These separated moving objects are the keys for any development on analytics application. Efficient execution of this task using various sensory data that represents a dynamic scene is challenging and is of immense interest to the experts in the domain of intelligent machine vision technology and related applications. Foreground object extraction in the sensory images is a primary requirement and several basic technologies are adopted by the experts in image processing and computer vision. Foreground object extraction can be treated as a background subtraction problem. That is in a video, foreground objects can be detected simply by subtracting the current image from a background image of the scene. This background needs to be determined beforehand.

In addition to estimation of proper background scene, another key challenge is the detection of objects in sensory images and distinguishing the objects from the background is a challenging task. The features of object sixels tend to be similar to those of background sixels and likely to be part of background. Hence any single traditional background estimation technique is unable to distinguish the object sixels from the background sixels. Instead of sixels, another approach tracks position of the objects to detect the possible objects in a scene. In a noisy scene where position and shape of the objects vary a lot, it becomes very hard to find the objects properly. The problem becomes even worse when temporary occlusion of the objects happens in the scene. Therefore, this object tracking based approach is very error prone in real environment.

After the objects are detected in the sensory image, they are tracked to link in image sequence and to predict the next movement. The tracking is usually done in each of the image data. By tracking and analyzing the tracked results using an error minimizing prediction mechanism different types of event of interest can be detected. This is what is called video analytics applications in general.

The present invention thus also discloses advancement in the process and an intelligent unified framework for object analysis in a scene in order to develop efficient sensory data analytics applications and other intelligent machine vision technologies. The overall framework comprises of several novel approaches to develop underlying tasks to accomplish this. One such task is an adaptive process for accurate and predictive technique for background estimation. The technique relies on sixel correlation of neighboring sixels and inter-frame correlation under severe natural conditions effecting the sensory data. The developed technique is adaptive to the content in the scene and their features such as sensory data variation, complexity of the scene, motion activity, as well as naturally induced noise in the scene.

Figure 5A:
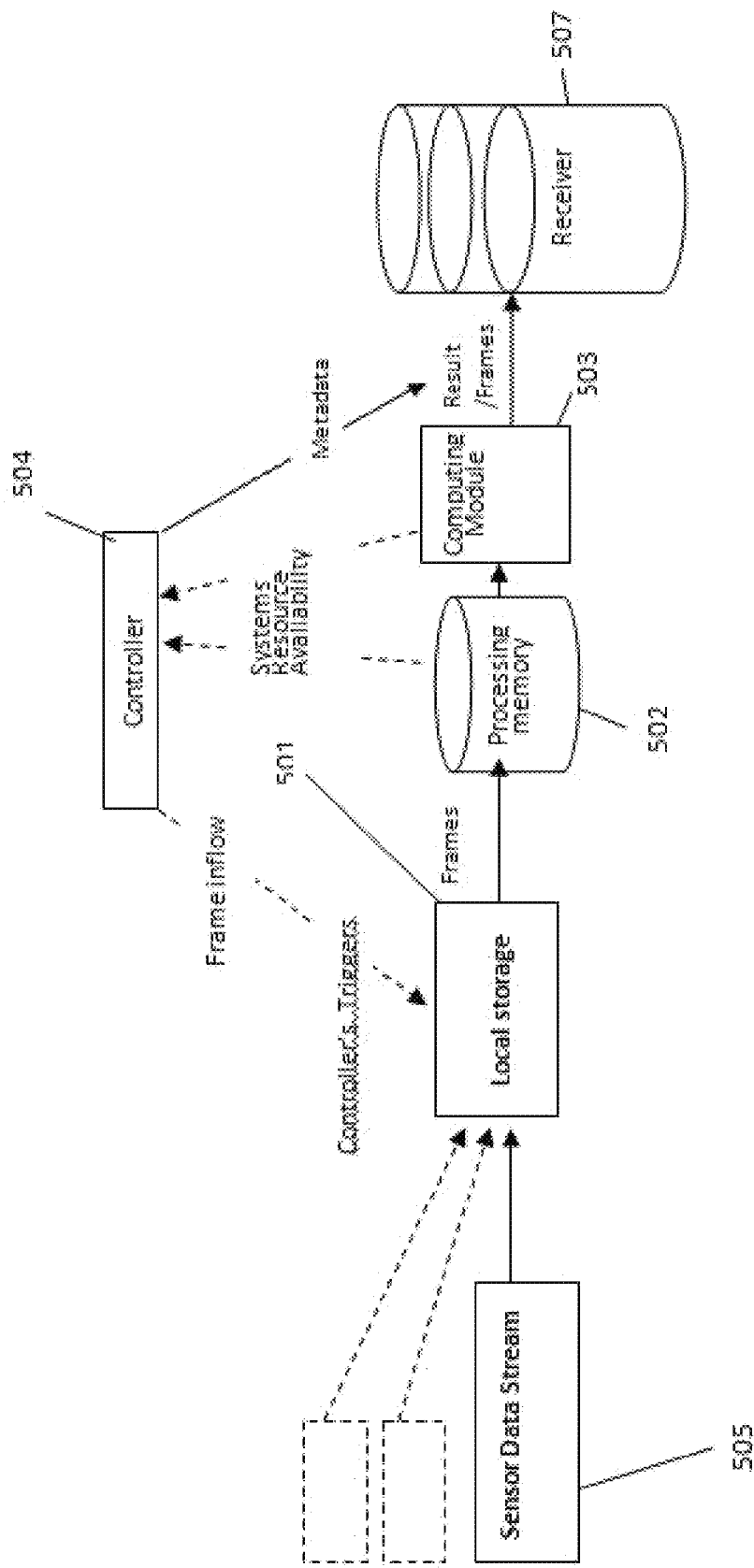
FIG. 5a shows sensory dataflow mechanism through the analytical server of the present integrated intelligent server based system.

In a preferred embodiment of the present integrated intelligent server based system, each analytical server of the analytical server group basically comprises a local storage, an image analyzer and a controller. An illustrative data flow mechanism of the sensory data through the analytical server of the present integrated intelligent server based system is shown in the accompanying FIG. 5a. As shown in the referred drawing, the local storage (501) of an analytical server first stores the sensory data (505) with timestamp and form sixel based sensory images for each of the channels connected to that analytical server. The sixel based sensory images corresponding to the connected channels are then transferred to the image analyzer (502,503) of that analytical server in a temporal sequence based on the stored timestamp to form frames representing temporal variation of the sensory data.

The image analyzer (502,503) of the analytical server analyzes the frames to infer temporal and spatial association of the objects in the frames and generate the analysis result. The controller (504) continuously monitors available computational space of the processor at any point of time and accordingly adjusts number of the frames per second feeding into the image analyzer (502,503). The controller also controls streaming of the sensory data with the generated analysis result to the receiver module (507) either as individual stream for each of the channel, or as a joined single stream of sensory data for all or user requested channels among the connected channels.

The local storage (501) of the analytical server present system is specifically configured to allocate memory locations having two dimensional address spaces to store the sensory data of each of the channels (505) in two dimensional grid structure to form the sixel based sensory images for each of the channels. Each of the sixle of the sensory image corresponds to value of the sensory data in each grid point of the grid structure and each grid point corresponds to the region where the sensor has been deployed.

The image analyzer of the analytical server preferably comprises a data input port, a processing memory (502) and a computing module (503). The data input port facilitates receipt of the sensory data from the local storage in the form of frames based on trigger signal of the controller (504) wherein each of the frames received by the image analyzer basically corresponds to cluster of multiple sixel based sensory images corresponding to different channels having identical timestamp. The processing memory (502) is disposed in operative communication with the data input port to temporarily store the received frames till the determination of the sense from the frames and infer dynamics of the objects in the stored frames.

Figure 5B:
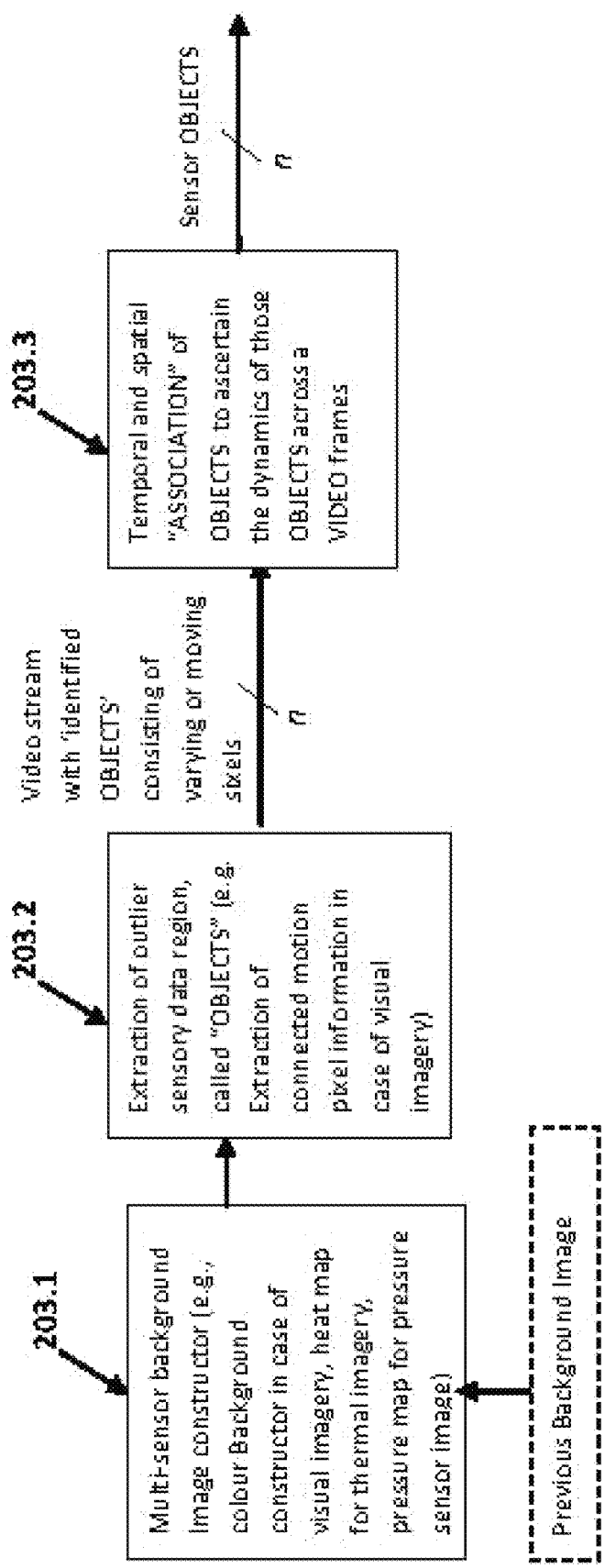
FIG. 5b shows a schematic layout of sensory image analysis in the analytical server of the present integrated intelligent server based system.
Figure 5C:
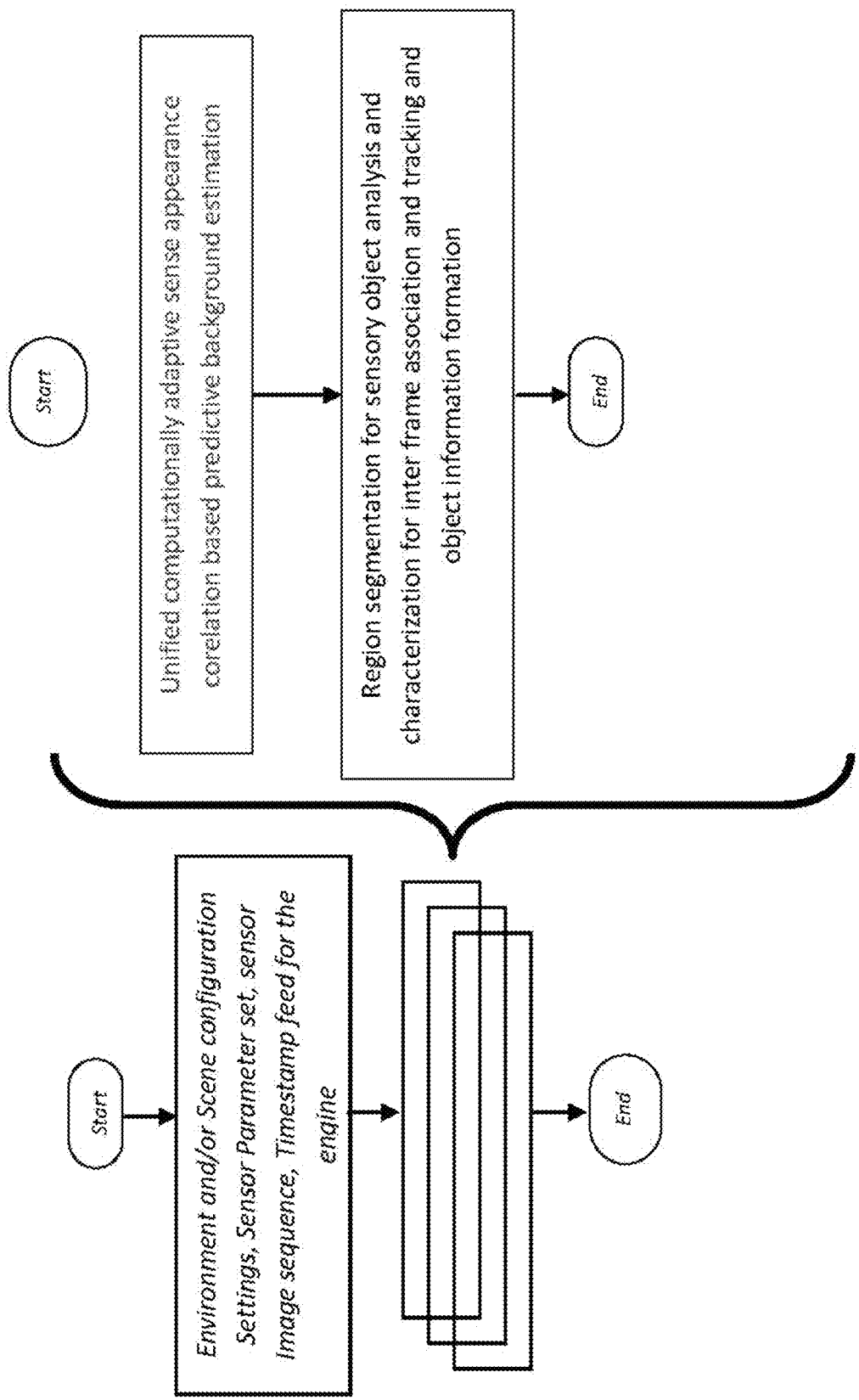
FIG. 5c shows process flow for sensory object tracking in the analytical server of the present integrated intelligent server based system.
Figure 6:
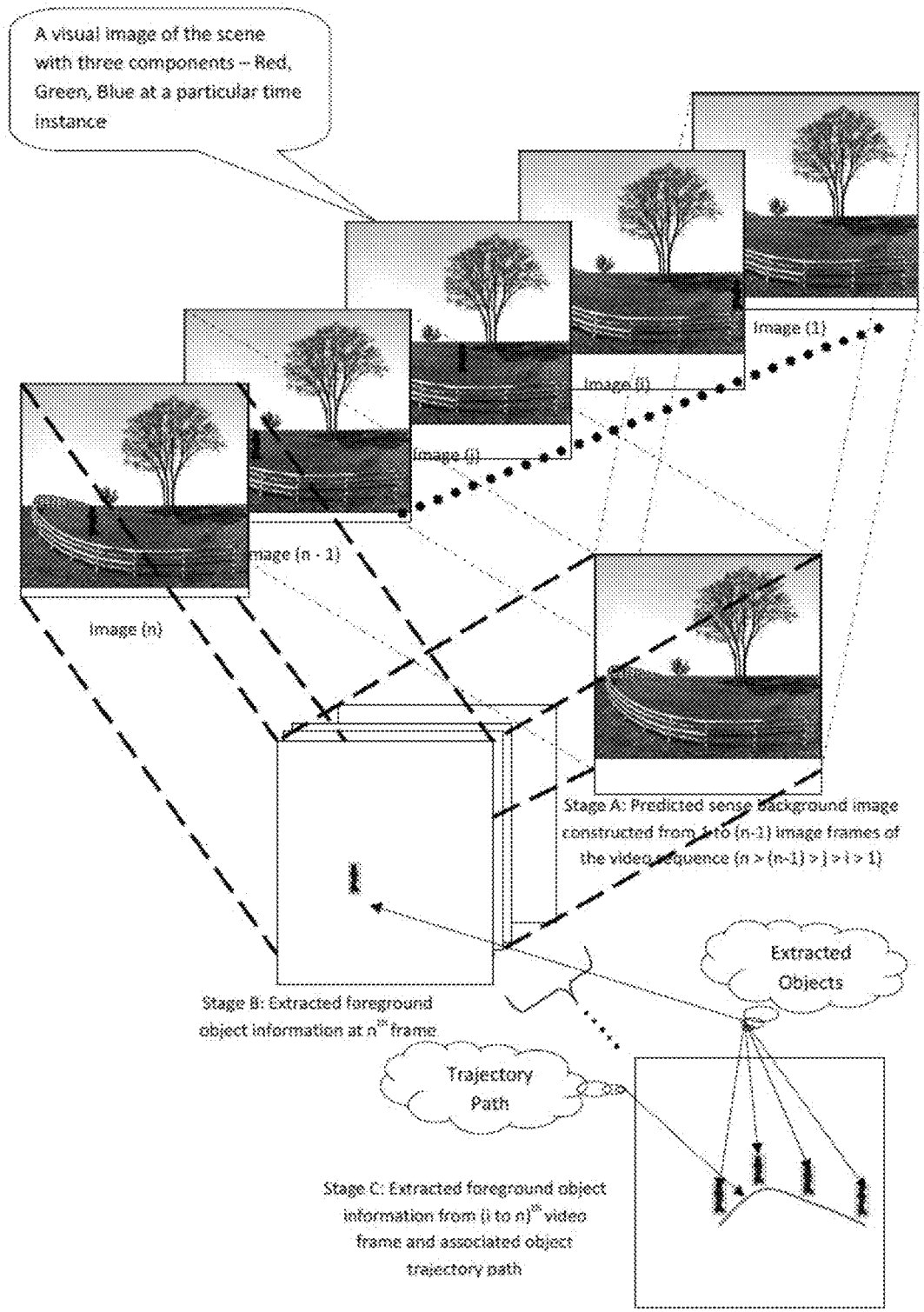
FIGS. 6 and 7 are illustrations of object analysis stages involving the unified multiple sensory data mapped imagery analysis of the present integrated server based system.

The computing module (503) is disposed in operative communication with the processing memory (502) to access the stored frames and analyze them. The computing module (503) is basically computer system comprising of a first computer embodying executable first set of computer program instructions for estimating background reference corresponding to the frames stored in the processor memory, a second computer embodying executable second set of computer program instructions for extracting foreground objects in the frames based on estimated background reference and a third computer embodying executable third set of computer program instructions for analysing segments according to the extracted foreground objects to infer dynamics of the object using pre-determined application dependent rules to identify occurrences of any rule violation or nature of anomaly in the region under the sensory surveillance. The computing module (503) is also disposed in operative communication with the controller (504) to forward the generated analysis result and streaming to the receiver module (507). The object tracking stages is also illustrated in the accompanying FIG. 5b.

In the present computing module, the first computer computes an adaptive local window centring around each sixel of the frames received from the processor memory and accumulates all sixel values in the adaptive local window in different sensory clusters depending on their distinguishability criteria of appearance enabling each sensory cluster consist of mean representative sixel values corresponding to each of the frames under analysis with span of sensory value deviation and a number of appearance of a sixel in that cluster. After constructing the sensory clusters, the first computer splits all the sensory clusters having large sensory value deviation and merges all the sense clusters having close mean representative sixel value. Then, the first computer constructs the background reference corresponding to the frames under analysis from sensory values of the generated merged cluster. In order to compute the adaptive local window centring around each sixel of the frames, the first computer involves the following processing steps i. constructing an initial window of size (h, w) centring around the sixel;
ii. computing normalized average intensity (k) of all the sixels in said initial window of size (h, w) by following $$k = \frac{Avg(h, w)}{255},$$

assuming each component in the sixel value is represented by 8 bits;

iii. forming the adaptive local window of size (k*h, k*w) local window centring around the sixel whereby for all 0<k<1, the adaptive local window size reduces with reduction of the intensity in the region surrounding the sixel and number of distinguishable sixels which reduces the reduction of intensity of sensory values in a region enables minimization of propagation of the error in possible prediction and estimation of appearance of distinguishable sixels.

Formation of sixel clusters: A sensory cluster is a group of all those neighbouring sixels that are different from other neighbouring sixels. The differences lie in the values of the sixels at any particular instant of time relative to their previous weighted-average values. The neighbouring sixels that have these relative values above a certain threshold value form a cluster. The threshold values are set based on the type of particular sensory data as well as on the area of application.

Subsequent to the estimation of the background, the second computer extracts the foreground objects in the frames under analysis by first constructing a reference frame for each input frame stored in the processor memory from the estimated background reference corresponding to previous one or more of stored frames of that input frame. The second computer then compare the input frame with its reference frame and constructs a difference image to extract the foreground objects. The second computer also executes segmentation of the difference image according to the extracted foreground objects.

After completion of the extraction of the extraction of the foreground objects, the third computer analyzes each segment of the difference image individually for classification of the objects. The third computer first compare each captured foreground object with predefined typical object shape, silhouette, color feature for categorizing the objects and then analyze the objects by associating with the previous frames to infer dynamics of the object and using pre-determined application dependent rules to identify occurrences of any rule violation or nature of anomaly in the region.

Various rule sets for inferencing the dynamics of the objects (interpretation of Events) are defined inherently in the computing modules of the analytical servers of the present system or they can be defined by the users. The third computer of the computing module on detection of dynamics of the objects conforming to one or more events, sends notification messages with relevant details to the recipients or the receiver module. The recipients can be the central server (204) or Surveillance Clients or any other registered devices.

In the present analytical server, the controller continuously monitors availability of the processing memory for storing the frames and computational complexity of the computing module for analyzing different frames to dynamically adjust the number of the frames per second feeding into the processor. The controller computes the computational complexity of the computing module based on (a) inter class difference of the foreground objects and background reference (b) number of foreground objects extracted and (c) extent of analysis of the segments.

The controller also includes encoder for encoding the streaming of the sensory data receiver module with variable rate depending upon available bandwidth from the analytical server to the receiver and transmitting a frame header with each frame containing metadata about position, identity of the channel frame within the combined frames, resolution of the individual frames, a timestamp of the constituent streams, and the analysis result corresponding to the multi-sensory images of the connected frame to enable the receiver module to split the combined stream of frames and interpret the frames based on said frame header.

Figure 9:
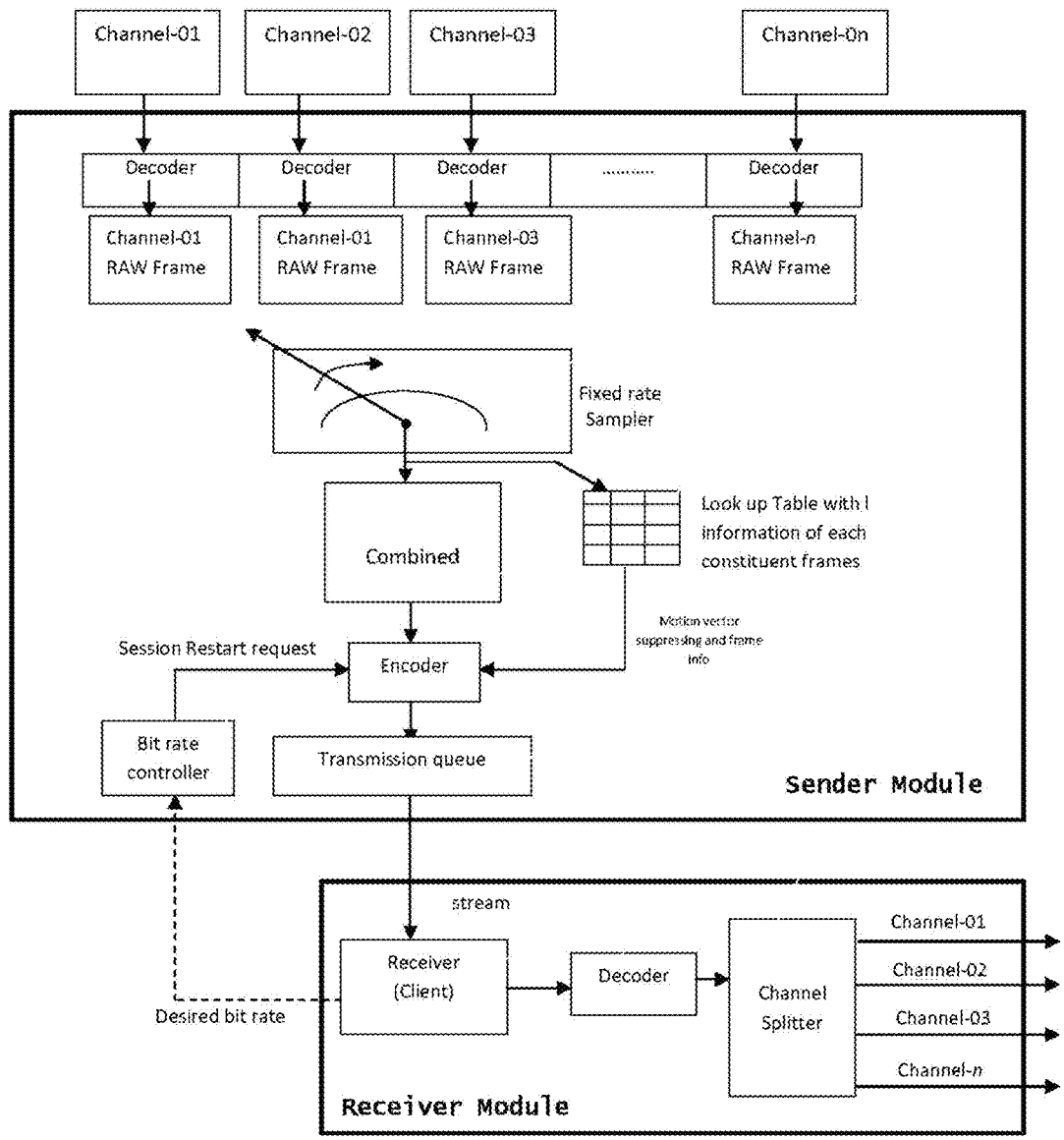
FIG. 9 shows streaming of the sensory data to the receiver module in the present integrated intelligent server based system.

The operation of the streaming of the sensory data to the receiver module as individual stream for each of the connected channel, or as a joined single stream of sensory data for all or user requested channels among the connected channels with framer header in variable bit rate depending upon available bandwidth from the analytical server to the receiver is illustrated in the accompanying FIG. 9. The decoder of the receiver module is particularly adapted to decode the multi sensory images of the frames as received from the analytical server. The decoder of the receiver module is basically a natural extension of standard visual image decoders, suitably modified to extract more number of image planes as the multi sensory images received from the analytical server may include multiple image planes corresponding to different sensory values apart from the usual spectral values of optical sensors/cameras.

Reference is now invited from the accompanying FIGS. 8 and 9 showing the illustrative examples of analysis of the sixel based sensory images by the present analytical server. The illustrated examples three sixel components X, A, B have been used (there could be any arbitrary number of such components depending upon application, however, for the ease of explanation of the presented art, three sensory components X, A, B have been used) as a composite single structure in a unified manner to preserve the mutual relationship of these sensor components in each individual sixel in order to maintain true appearance of "sense" in the environment in the estimated sensory background frame or background sensor image. The processing module continuously updates its modeled or predicted values for each sixel in a frame with all sequential forthcoming frames of the sensory video. During the background estimation, it also correlates spatial distribution of the sensory values in a local region to model the sixel background sensory value more accurately. For each sixel (x, y) in the input sensory frame below given steps are followed, if that sixel doesn't belong to any detected object region in the previous sensory frame of the sensory video sequence. The flow-chart for stage A is shown below:

A.1. If the sixel location in the current frame belongs to a object sixel in the previous frame, then estimation of the sensory background in that sixel location is skipped since this sixel does not contribute to the background. Otherwise, an adaptive size (k*h, k*w) local window centering around this sixel is computed for computation of the background estimation using the sixel values within this window, where $$k = \frac{Avg(h, w)}{255}$$

representing normalized average intensity of all the sixels (assuming each component in the sixel value is represented by 8 bits, but not limited to) in window size (h, w). for all 0<k<1, the processing window size reduces with the reduction of intensity in the region surrounding the sixel.

It should be noted that the number of distinct appearance of "sense" reduces with the reduction of intensity of sensory values in a region. Hence above adaptive window selection technique minimizes propagation of the error in the possible prediction and estimation of appearance of "sense" in the sixel. It is adaptive to the variation of sensory values and also requires significant low computation in low intensity sensor image regions as opposed to non-adaptive nature. This is new and novel.

A.2. As described earlier in this embodiment, the composite representation of group of sensory data values in the same grid is termed as "sense" of the sixel. All the sensory values in above window are accumulated in different sensory clusters depending on their distinguishability criteria of appearance of "sense" as follows so that each sensory cluster consist of a mean representative sixel value $(\mu_X, \mu_A, \mu_B)_k$ with span of sensory value deviation $(\sigma_X, \sigma_A, \sigma_B)_k$ and a number of appearance $(v_k)$ of a sixel in this cluster.

i. A sixel (X,A,B) is matched with the sensory cluster k, if the difference between each sensor component in sixel (X,A,B) with the corresponding representative sixel component $(\mu_X, \mu_A, \mu_B)_k$ of cluster k, i.e. $|\mu_X-X|<\sigma_X$, $|\mu_A-A|<\sigma_A$, and $|\mu_B-B|<\sigma_B$.

If "sense" of any sixel in frame $F_m$ matches with a cluster derived up to the previous frame $F_{m-1}$, then readjust the mean representative sixel value $(\mu_X, \mu_A, \mu_B)_k$ and the span of the deviation of the "sense" culster $(\sigma_X, \sigma_A, \sigma_B)_k$ as $$\mu_X^m = C^*\mu_X^{m-1} + D^*X,$$

$$\mu_A^m = C^*\mu_A^{m-1} + D^*A,$$

and $$\mu_B^m = C^*\mu_B^{m-1} + D^*B$$

Where C and D are experimentally driven enumerated values for the recurrence relation. The total number of occurrence of the sixel in cluster k is also adjusted as $v_k^m = v_k^{m-1} + 1$.

ii. If the "sense" of the sixel is not matched with any cluster with above criteria, then we create a new sense cluster with mean value (X, A, B) and default chosen allowed threshold for deviation $(\sigma_{Th}, \sigma_{Th}, \sigma_{Th})$ and number of occurrence v=1 iii. Split all the sense cluster which have a large σ value and Merge all the sense cluster which have very close μ value. The probability of occurrence then adjusted in the same ratio of the estimated sense clusters for that population.

This "sense" coherent splitting and merger of clusters for finer granular "sense" matching is new and novel. It should be noted that the number of distinct sense clusters increases with increase of global intensity of the sixels in the environment or scene (such as intensity of light or luminance in a visual imagery). With the proposed intuitive approach one can accurately compute the mean sixel value of any cluster. Also, this intuitive approach when applied in visual imagery, one can accurately compute the mean color pixel value consuming very less computation opposed to any known prior state-of-art.

A.3. The sensory background reference frame is constructed from sensory values of the generated cluster. If matched sensory cluster has significantly high occurrence then the representative sense of the sensory cluster is used as the value of the sixel in the sensor background reference frame.

Figure 7:
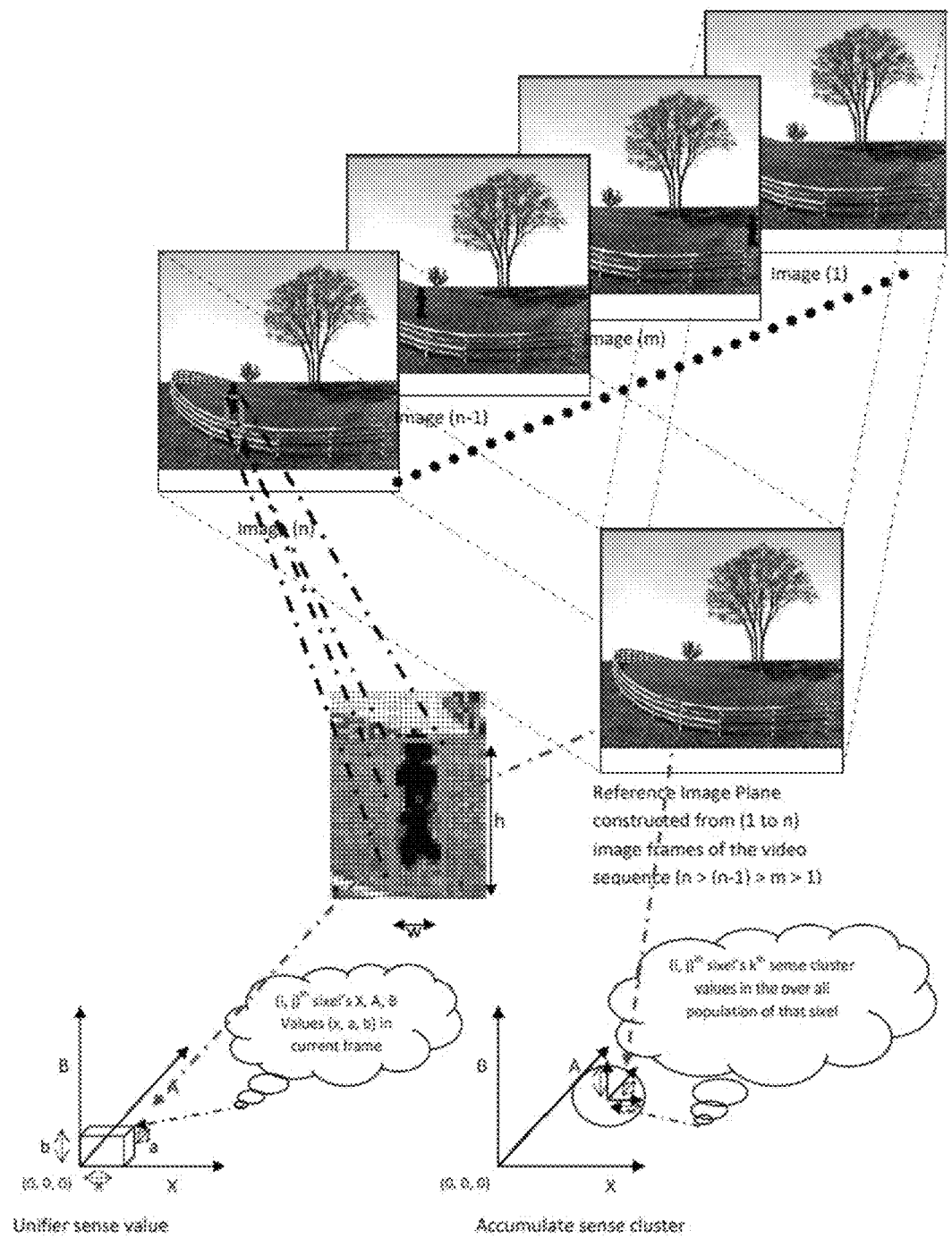

The above steps have been pictorially demonstrated in FIG. 7. Again, in this figure, for the sake of easy explanation and visualization of the objects, help of visual imagery is taken to show these steps in background estimation.

From the estimated background modeled information, a suitable reference frame is constructed for each forthcoming input sensor video frame. It is worth to repeat that in this embodiment a video or sensor video represents a sequence of sensor images, where each element in the sensor image represents a sixel which is one or more components of various sensory values. From the input frame and reference frame a difference image is constructed to extract the foreground objects (B) in the scene. This difference image is then segmented (C) using different suitable image processing based clustering method and morphological techniques. Each captured foreground component then individually analyzed for their classification purpose. Using typical object shape, silhouette, color feature, they are categorized into different modeled object for any typical scene, then they are finally associated with previously detected object set of the scene using overlapping and color feature for more generalized information of those objects in the video. The generated object information is then analyzed to infer dynamics of the object using pre-determined application dependent rules to identify occurrences of any rule violation or nature of anomaly in the environment.

In the present integrated server based system, the central sensory data management server (204) is adapted to serve as a gateway to any autonomous system (210-01 . . . 210-0n) components. It also stores the configuration data for all autonomous systems in its centralized database. The central sensory data management server (204) can be accessed through the standalone surveillance client or any standard Internet browser can be used to access the system. Handheld devices like Android enabled cell phone or tablet PCs can also be used as a Client to the system for the purposes (wholly or partially).

A Sitemap server is also included within each autonomous system (210-01 . . . 210-0n) and also within the centralized sensory data management server (204). The Sitemap server listens to requests from any authorized components of the System and responds with positional data corresponding to any component (Camera, server, user etc.) which is linked to the Site map. The Site map is multilayered and components can be linked to any spatial position of the map in any layer.

The Remote event receiver (206) is a software module which can be integrated to the analytical server. The Remote event receiver (206) is meant to receive and display messages, alters and operational instruction for other components, which may include subsequent hardware. Those messages include Event ALERTS, ERROR status, operator generated messages, etc. The Messages can be in the Video as well as Audio form, or any other form and the resulting response from by the Remote event receiver depends on the capability and configuration of the hardware where it is installed. When integrated with the Surveillance clients (IVMC), the servers can operate can be switched to Remote event receiver mode and thus will respond to ALERTs and messages only.

In a preferred embodiment of the present invention, the remote event receiver may comprise object tracking system for continuously tracking one or more moving objects extracted from the frames corresponding to the optical sensors like cameras. The object tracking system operates in conjunction with the third computer of the computing module and PTZ camera.

Figure 8A:
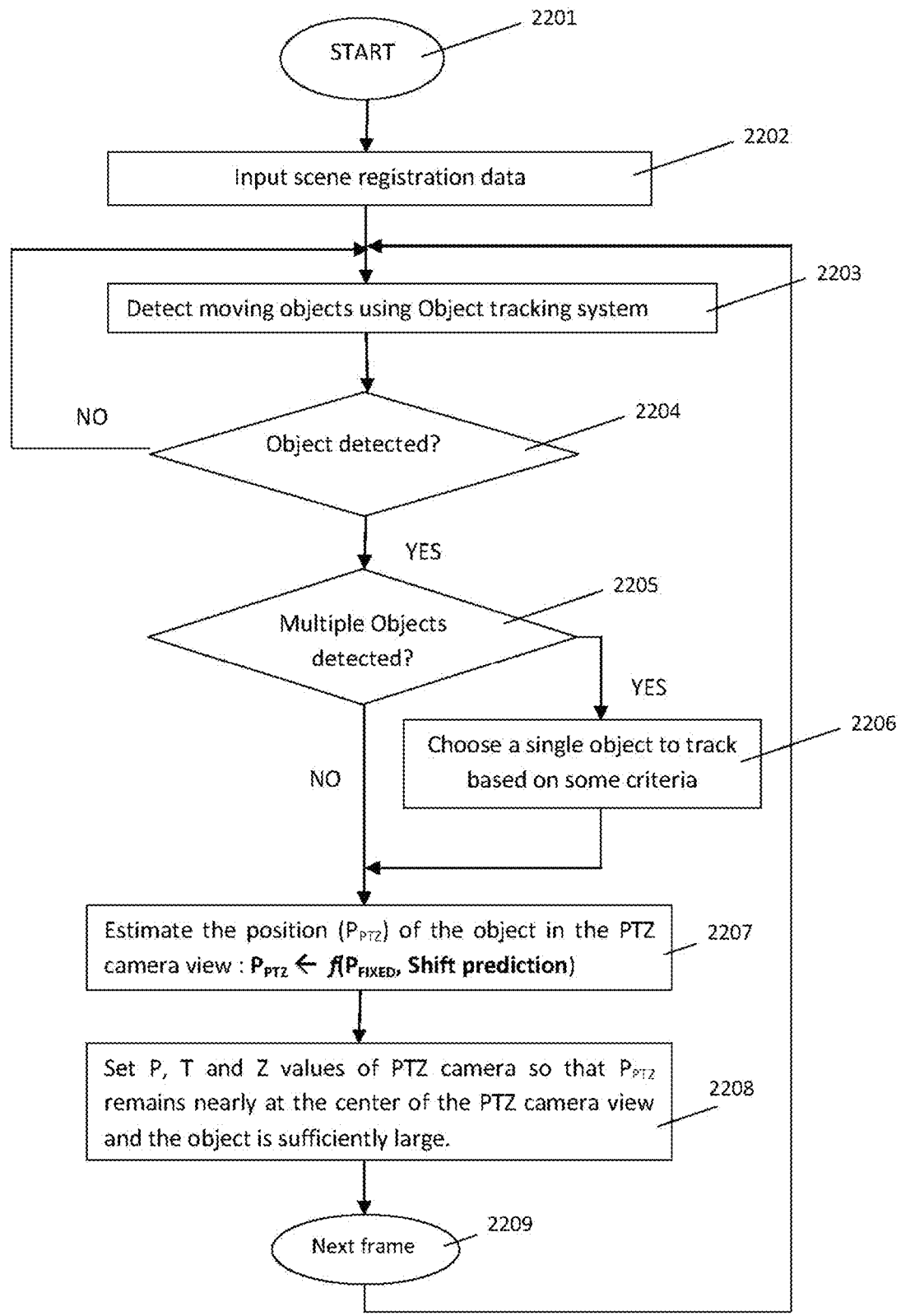
FIGS. 8a and 8b shows object tracking operation in the present integrated intelligent server based system.
Figure 8B:
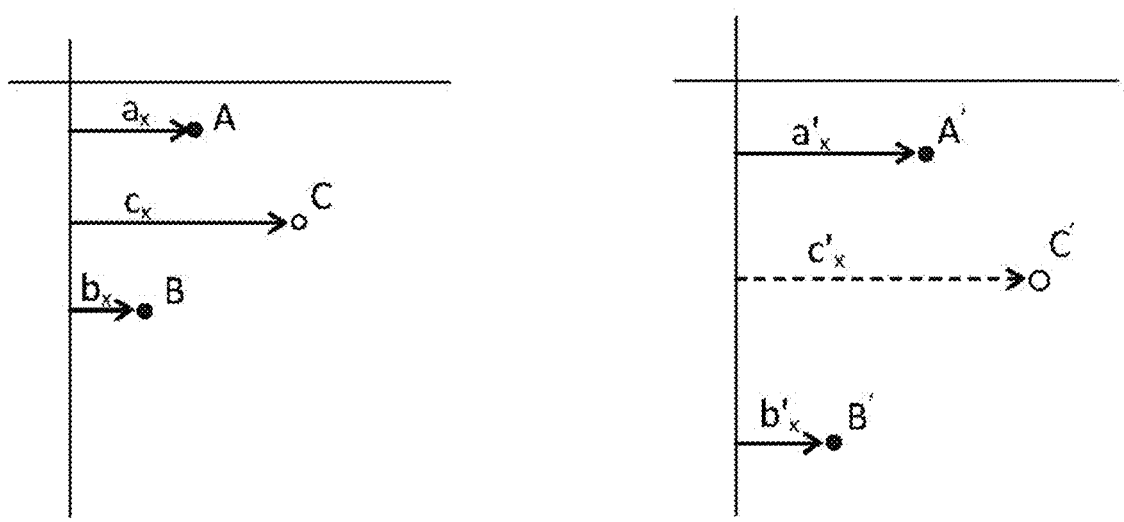

Reference in this context invited from the accompanying FIGS. 8a and 8b which illustrate in greater detail the features of the advancement involving enhanced object tracking.

In some of embodiment of the present invention, video data of the region as captured by one or more sensory channels having fixed camera is analyzed to detect and track moving objects. However, this requires the background to be stable and the camera should cover the whole region where the trajectory is to be formed. This has the side effect that the size of the object in the camera view becomes small, particularly when the object is far. To overcome this limitation, PTZ Camera based Tracking Systems are used where A PTZ camera is used to automatically track the object and zoom on the object so that the detail features of the object is visible in the video frames. However, traditional PTZ based tracking system suffers from some major drawbacks and is not deployable in a real-life video, particularly when the video is infected with noises like shadow, glare, electronic noises etc. One of the reason is the inability of such systems to form a good reference background frame. Also, the system is non adaptive to demographic and environmental variations.

Additionally, when PTZ camera starts tracking an object, it loses the visibility of other parts of the scene. Therefore, some important scene event may be missed while the PTZ camera tracks one of the objects. This may encourage miscreants to fool the system. The accuracy of detection and tracking of objects is also very low, as there is no fixed background while the tracking is in progress and the foreground objects are to be extracted based on motion detection or some modified version of the method or using some modified version of object extraction technique from still images. In case of some tracking error, which is likely to occur when the speed of the object in the scene is high or random, the system cannot recover from this error state in a short time, as it loses visibility of the object.

To take the best of the above two techniques, a novel method is designed where an Object tracking system is used in conjunction with one or more PTZ cameras. When an object is detected in the Fixed camera view, the object tracking system tracks the object and pass on the positional information of the object along with a velocity prediction data to the PTZ camera controller in a periodic manner. If more than a single object is detected, one object is taken at a time for handling based on some criteria (viz, the priority of the zone where the object appeared, the duration of the object in the scene etc.). A PTZ camera controller receives the positional information of the object periodically and estimates corresponding position of the object in the PTZ camera view using a novel Scene Registration and coordinate transformation technique. The P, T and Z values are set by the Controller such that the object remains nearly at the center of the PTZ camera view and is sufficiently large.

Hence, the proposed system enhances the functionalities and utility of a traditional Object tracking system and at the same time eliminates the drawbacks of a standalone PTZ camera based tracking mechanism. This concept and implementation technique is novel and unique. The concept can be extended to develop a system to handle multiple objects in parallel with the more than one PTZ cameras. Also, trigger from multiple fixed cameras can be received to develop a system with multiple fixed cameras and multiple PTZ cameras together to cover a wider range in the scene, or to enhance multiple Object tracking systems over a single framework.

To map the bounding rectangle of an object visible in the Static camera view to the corresponding Rectangle in the PTZ camera view a weighted interpolation technique is used. The technique requires as input a set of points (A, B . . . ) spread uniformly over the static camera view and their corresponding positions in the PTZ camera view. This can be done by the user while configuring the system.

Let A and B be any two such points in the static camera view as marked by the user, and let A' and B' be the corresponding mapped points in the PTZ camera view as also marked by the user. Now, any arbitrary point (C) in the static camera view is mapped to the corresponding point (C') in the PTZ camera view dynamically, using the following method:

Let $a_x$, $b_x$, $c_x$ are x-coordinates of points A, B and C respectively in the static Camera view. Similarly, $a'_x$, $b'_x$ and $c'_x$ are for the corresponding points in PTZ view. Let, $$C'_{xAB} = B_x'+[(A_x'-B_x') \times (C_x-B_x) \div (A_x-B_x)]$$

This gives an estimate of the x-coordinate of the point C' as interpolated with the help of points A and B, with a confidence factor $W_{AB}$, where $W_{AB}=(A_x-B_x) \div$ [Minimum of $(C_x-B_x, C_x-A_x)$].

Similarly, an estimate of x-coordinate of the same point C is calculated for all pair of points (A, B) in the Static camera view.

Now, $C'_x = \Sigma[C'_{xAB} \times W_{AB}] \div \Sigma W_{AB}$

Similarly, the y-coordinate $C'_y$ is calculated for the point C.

When a bounding rectangle is to be mapped from the static view to the PTZ view, this technique is applied for all the four corner points of the rectangle.

What is claimed is:

1. An integrated intelligent server based system for unified multiple sensory data mapped imagery analysis of sensory data received from channels and streaming of the sensory data along with analysis result to a receiver module comprising at least one autonomous system containing one or more analytical server;

a seamless and intelligent interconnection of said autonomous systems receiving said sensory data from said channels for unified multiple sensory data mapped imagery analysis including a cooperative communication channel between all of said autonomous systems enabling desired scalability of number of the autonomous systems spread across wide geographical regions and also allocating the sensory data from the channels to the analytical servers contained in said autonomous systems through said cooperative communication channel, wherein each of said analytical server is enabled for storing the sensory data received from the channels connected to that analytical server, analyzing the stored sensory data to generate the analysis result and streaming of the sensory data with the generated analysis result to the receiver module either as individual stream for each of the connected channel, or as a joined single stream of sensory data for all or user requested channels among the connected channels; and an intelligent interface communication channel operatively linked to said cooperative communication channel, for carrying the frames with the analysis result of each said analytical server to the receiver module.

2. The integrated intelligent server based system as claimed in claimed 1 for unified multiple sensory data mapped imagery analysis of sensory data received from channels and centralized storing and streaming of the sensory data along with the analysis result to a receiver module comprising at least one autonomous system containing one or more said analytical server and one or recording server;

a seamless and intelligent interconnection of said autonomous system receiving said sensory data from said channels for unified multiple sensory data mapped imagery analysis and centralized storing including a cooperative communication channel between all of said autonomous systems enabling desired scalability of number of the autonomous systems spread across wide geographical regions and also allocating the sensory data from the channels to said analytical servers and said recording servers of said autonomous systems through said cooperative communication channel whereby said cooperative communication channel enabling assesing respective server capacity, configuration of each of the recording servers to operate them as a group of the recording servers and to enable fail-safe support when any of the recording servers in the group fail to operate, remaining operative recording servers in the group distribute and take over the sensory data load of said recording servers in the group which fail to operate to thus render the system fail safe and self-sufficient;

wherein, each of said recording server in the group comprises:

local storage for storing the sensory data in segmented clips of various size and monitor sensory data inflow rate for each of the channels into the recording server and available network bandwidth to a network accessible central storage; and said intelligent interface communication channel operatively linked to said cooperative communication channel, for carrying the frames with the analysis result of each said analytical server to the receiver module and carrying said sensory data of each said recording server to the network accessible central storage involving intelligent network bandwidth sharing amongst said channels for transferring said sensory data received from the channels to the network accessible central storage based on real time available network bandwidth as well as each of said sensory data inflow rate, local storage space of the respective recording servers wherein each of said recording server is self enabled for adjusting of rate of uploading of said segmented clips received by it to said network accessible central storage from an individual channel based on the available network bandwidth for uploading to the central storage and the sensory data inflow rate for said individual channel to its connected recording server and free local storage space of said recording server connected to said individual channel for transferring the sensory data received from said individual channel to the network accessible central storage via the local storage of said recording server in a failsafe bandwidth optimized manner utilizing optimal bandwidth and share the available network bandwidth amongst the channels and their respective recording servers for uploading the sensory data to the network accessible central storage in fail safe manner.

3. The integrated intelligent server based system as claimed in claim 1, wherein each of the channels corresponds to a sensor deployed over any region or a cluster of identical sensors deployed over multiple regions of any zone for sensing a parameter of that zone and generating sensory data.

4. The integrated intelligent server based system as claimed in claimed 1, wherein each of said analytical server comprises:
   local storage for storing the sensory data and forming sensory image for each of the channels connected to the analytical server;
   image analyzer for receiving said sensory images corresponding to the connected channels in temporal sequence forming frames representing temporal variation of the sensory data and therefrom analyzing temporal and spatial association of objects to generate the analysis result; and
   controller for adjusting number of the frames per second feeding into said image analyzer depending on available computational space of the image analyzer at any point of time, including streaming of the sensory data with the generated analysis result embedded within the images itself to the receiver module either as individual stream for each of the channel, or as a joined single stream of sensory data for all or user requested channels of the connected channels.

5. The integrated intelligent server based system as claimed in claim 4, wherein the local storage of the analytical server stores the sensory data with timestamp and generate sixel based sensory image for each of the channels connected to the analytical server.

6. The integrated intelligent server based system as claimed in claim 5, wherein the local storage of the analytical server includes memory locations having two dimensional address space to store the sensory data of each of the channels in two dimensional grid structure to form sixel based sensory image for each of the channels whereby the sixel corresponds to value of the sensory data in each grid point of the grid structure and each grid point corresponds to the region where the sensor has been deployed.

7. The integrated intelligent server based system as claimed in claim 4, wherein each of the frames corresponds to a group of multiple sixel based sensory image planes corresponding to different channels having identical timestamp.

8. The integrated intelligent server based system as claimed in claim 4, wherein the controller stores the sensory data in the local storage of the analytical server overwriting the existing stored sensory data which are fed into the processor and streamed into the receiver module.

9. The integrated intelligent server based system as claimed in claim 4, wherein the image analyzer comprises:
   data input port to receive the frames via the controller;
   processing memory to temporarily store the frames till interpretation of the composite values of the one or more sixels of the frames and infer dynamics of the objects in the stored frames; and
   computing module operatively connected with said processor memory to access the stored frames and analyze them by including:
   estimating a background reference corresponding to the frames stored in the processor memory, comprising:
   computing an adaptive local window centring around each sixel of the frames;
   accumulating all sixel values in the local window in different sensory clusters depending on their distinguishability criteria of appearance enabling each sensory cluster consist of mean representative sixel values corresponding to each of the frames under analysis with span of sensory value deviation and a number of appearance of a sixel in that cluster; and
   splitting all the sensory cluster having large sensory value deviation and merging all the sense cluster which having close mean representative sixel value and constructing the background reference corresponding to the frames under analysis from sensory values of the generated merged cluster;
   extracting foreground objects in the frames under analysis by including:
   constructing a reference frame for each input frame stored in the processor memory from the estimated background reference corresponding to previous one or more of stored frames of that input frame;
   comparing the input frame with its reference frame and constructing a difference image to extract the foreground objects; and
   segmenting the difference image according to the extracted foreground objects;
   analysing each segment individually for classification of the objects by including:
   comparing each captured foreground object with typical object shape, silhouette, spectral feature in the computing module for categorizing the objects; and
   analyzing the objects including associating with the previous frames to infer dynamics of the object using pre-determined application dependent rules to identify occurrences of any rule violation or nature of anomaly in the region;
   said computing module is operatively connected with the controller to forward the generated analysis result and streaming to the receiver module.

10. The integrated intelligent server based system as claimed in claim 9, wherein the computing module computes the adaptive size local window by:
   constructing an initial window of size (h, w) centring around the sixel;
   computing normalized average intensity (k) of all the sixels in said initial window of size (h, w) by following $$k = \frac{Avg(h, w)}{255},$$

assuming each component in the sixel value is represented by 8 bits; and
   forming the adaptive local window of size (k*h, k*w) local window centering around the sixel whereby for all 0<k<1, the adaptive local window size reduces with reduction of the intensity in the region surrounding the sixel and number of distinguishable sixels which reduces the reduction of intensity of sensory values in a region enables minimization of propagation of the error in possible prediction and estimation of appearance of distinguishable sixels.

11. The integrated intelligent server based system as claimed in claim 9, wherein each of the sensory clusters corresponds to group of all neighbouring sixels that are different from other neighbouring sixels whereby the differences lie in the values of the sixels at any particular instant of time relative to their previous weighted-average values and the neighbouring sixels that have this relative values above a certain threshold value form a cluster, the threshold values are set based on type of particular sensory data as well as on the area of application.

12. The integrated intelligent server based system as claimed in claim 9, wherein the computing module discard the sixels of current frame of the frames belongs to the object sixel locations in previous frame of the frames from the estimation of the background reference corresponding to the frames.

13. The integrated intelligent server based system as claimed in claim 9, wherein the computing module includes computer system comprising of a first computer embodying executable first set of computer program instructions for estimating the background reference, a second computer embodying executable second set of computer program instructions for the extracting foreground objects and a third computer embodying executable third set of computer program instructions for analysing the segments.

14. The integrated intelligent server based system as claimed in claim 9, wherein the controller monitors availability of the processor memory for storing the frames and computational complexity of the computing module for analyzing different frames to dynamically adjust the number of the frames per second feeding into the processor.

15. The integrated intelligent server based system as claimed in claim 9, wherein the controller includes encoder for encoding and streaming the multi-sensory data in form of a single multi-sensory image sequences to receiver module with variable rate depending upon available bandwidth from the analytical server to the receiver and transmitting a frame header embedded with each frame containing metadata about position, identity of the channel frame within the combined frames, resolution of the individual frames, a timestamp of the constituent streams and the analysis result corresponding to the multi-sensory images of the frames to enable the receiver module to split and interpret the combined stream of frames based on said frame header.

16. The integrated intelligent server based system as claimed in claim 15, wherein the receiver module includes decoder which is a natural extension of standard visual image decoders, configured to extract one or more number of image planes as the multi sensory images received from the analytical server corresponding to different sensory values including usual spectral values of optical sensors/cameras.

17. The integrated intelligent server based system as claimed in claim 2, wherein all the recording servers and the analytical servers in the autonomous system auto register themselves by requesting and thereby getting a unique identification number.

18. The integrated intelligent server based system as claimed in claim 2 wherein the network accessible central storage comprises a cluster of one or more network accessible storage devices.

19. The integrated intelligent server based system as claimed in claim 1 wherein the receiver module comprises standalone surveillance client, internet browser, web client, any hand-held devices including mobile device client, and remote event and/or notification receiver having operative communication with the controller over ip based network; and said receiver module is further configured for establishing operative communication with the network accessible central storage over ip based network for accessing the stored sensory data.

20. The integrated intelligent server based system as claimed in claim 2, wherein the segmented clips of the sensory data include small granular clips or segments of programmable and variable length sizes and said clips stored in the local storages of the recording servers, the clip metadata being stored in a local database.

21. The integrated intelligent server based system as claimed in claim 2, wherein the recording server determine the rate of uploading of the segmented clips of the sensory data received from the channels to the network accessible central storage by:
calculating average of the rate of uploading for each channel separately in periodic interval including:
calculating the rate of clip upload ($U_i$) for a particular channel by (a) estimating the sensory data inflow rate ($D_i$) of said particular channel to the recording server; (b) identifying the available network bandwidth (B) at that instant from the system; (c) calculating the rate of clip upload for the particular channel, based on:

$$U_i = [B \times k \div \Sigma D_i] \times D_i,$$

where $0<k<1$, depending on how much of the remaining bandwidth is to be allocated for uploading task and amount of local storage space available in the recording server.

22. The integrated intelligent server based system as claimed in claim 1, wherein the intelligent interface communication channel (i) auto registers itself to the system, (ii) accepts request from surveillance clients or the receiver module and relays the same to corresponding recording server and analytical server, (iii) receives configuration data from the surveillance clients or the receiver module and feeds to the intended components of the system, (iv) receives the analysis result from the analytical server and transmits to various recipients including remote event receiver, fetches outstanding event frames, if any, (v) periodically receives heartbeat signals along with status information from all active servers and relays that to other devices in same or other networks, (vi) streams live frames, recorded frames or event alerts at appropriate time, (vii) joins multiple channel sensory inputs into a single combined stream to adapt to variable and low bandwidth network, (viii) enables search based on various criteria including data, time, event types, channels, signal features, and other system input and (ix) enables user to perform an user-interactive smart search to filter out desired segment of the sensory input.

23. The integrated intelligent server based system as claimed claim 1, comprises central sensory data management server operatively connected with all the autonomous systems for registering all the recording servers and the analytical servers into the autonomous systems generating unique Identification number; and
said central sensory data management server comprises a central database to store all configuration data related to the server including identification of sensory data sources or channels it caters to, the central storage it uses, the corresponding receiver module against the generated unique Identification number.

24. The integrated intelligent server based system as claimed claim 1, comprises remote event receiver includes object tracking system comprising:
object tracking means in conjunction and one or more PTZ cameras wherein when an object is first detected in a fixed camera view of the object tracking means the same is adapted to track the object and also generate and transmit the positional values along with a velocity prediction data to the PTZ camera controller; and said PTZ camera controller adapted to receive the positional information of the object in the PTZ camera view involving scene registration and coordinate transformation technique.

25. The integrated intelligent server based system as claimed in claim 24, wherein the PTZ camera controller carry out coordinate transformation following:
 a. identifying a set of points in the static camera as A, B, and also corresponding points A', B', . . . in the PTZ camera by the user;
 b. mapping any arbitrary point C in the static camera to the corresponding point C' in the PTZ camera view dynamically wherein:

$a_x$, $b_x$, $c_x$ are x-coordinates of points A, B and C respectively in the static Camera view and similarly $a'_x$, $b'_x$ and $c'_x$ are for the corresponding points in PTZ view where point C is interpolated with the help of points A and B, with a confidence factor $W_{AB}$, where $W_{AB}=(A_x-B_x)\div[\text{Minimum of }(C_x-B_x, C_x-A_x)]$ is determined to be $$C'_{xAB}=B_x'+[(A_x'-B_x')\times(C_x-B_x)\div(A_x-B_x)]$$

and wherein similarly, an estimate of x-coordinate of the same point C is generated for all pair of points (A, B) in the Static camera view based on:

$$C'_x=\Sigma[C'_{xAB}\times W_{AB}]\div\Sigma W_{AB}$$

and similarly generating also the y-coordinate $C'_y$ for the point C.

* * * * *